(12) United States Patent
England et al.

(10) Patent No.: US 10,539,727 B2
(45) Date of Patent: Jan. 21, 2020

(54) MODIFYING OPTICAL PROPERTIES OF THIN FILM STRUCTURES USING AN ABSORBING ELEMENT

(71) Applicant: President and Fellows of Harvard College, Cambridge, MA (US)

(72) Inventors: Grant England, Cambridge, MA (US); Calvin Russell, Cambridge, MA (US); Theresa Kay, South Stoney Creek (CA); Elijah Shirman, Arlington, MA (US); Ian Burgess, Toronto (CA); Nicolas Vogel, Erlangen (DE); Joanna Aizenberg, Boston, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 15/757,339

(22) PCT Filed: Sep. 6, 2016

(86) PCT No.: PCT/US2016/050378
§ 371 (c)(1),
(2) Date: Mar. 2, 2018

(87) PCT Pub. No.: WO2017/041085
PCT Pub. Date: Mar. 9, 2017

(65) Prior Publication Data
US 2018/0239070 A1 Aug. 23, 2018

Related U.S. Application Data

(60) Provisional application No. 62/214,508, filed on Sep. 4, 2015.

(51) Int. Cl.
*G02B 5/28* (2006.01)
*B42D 25/351* (2014.01)
(Continued)

(52) U.S. Cl.
CPC ........... *G02B 5/285* (2013.01); *B42D 25/351* (2014.10); *B44F 1/066* (2013.01); *B44F 1/08* (2013.01); *B41M 3/148* (2013.01); *B42D 25/373* (2014.10)

(58) Field of Classification Search
CPC . B44F 1/066; B44F 1/08; G02B 5/285; B42D 25/351; B42D 25/373; B41M 3/148
(Continued)

(56) References Cited

U.S. PATENT DOCUMENTS 5,173,800 A    12/1992  King
6,645,679 B1   11/2003  La Fontaine et al.
(Continued)

FOREIGN PATENT DOCUMENTS

EP       1055140 B1      9/2002
WO    WO-99/036808 A1    7/1999
(Continued)

OTHER PUBLICATIONS

Atwater, H. A. and Polman, A., "Plasmonics for improved photovoltaic devices," Nature Materials, vol. 9, pp. 205-213, 10 total pages (Mar. 2010).
(Continued)

*Primary Examiner* — Wen Huang
(74) *Attorney, Agent, or Firm* — Wilmer Cutler Pickering Hale and Dorr LLP

(57) ABSTRACT

A method of making a multi-layered film includes depositing thin film layers onto a first side of a double-sided transparent substrate. The thin film layers are transparent, and two adjacent layers of said plurality of thin film layers have different refractive indices. One or more absorbers are deposited at an interface formed between two of the thin film layers that are adjacent to one another, or formed by the first side of the substrate and one of the thin film layers. The
(Continued)

absorbers absorb selected wavelengths of incident light and reflect part of the incident light after inducing a phase shift. The location of the interface is selected to provide desired wavelengths of absorbed and reflected light. The multi-layered film has a first appearance when viewed from the first side of the substrate and a second appearance when viewed from the second side of the substrate.

20 Claims, 23 Drawing Sheets

(51) Int. Cl.
*B44F 1/06* (2006.01)
*B44F 1/08* (2006.01)
*B41M 3/14* (2006.01)
*B42D 25/373* (2014.01)

(58) Field of Classification Search
USPC .......................................................... 359/584
See application file for complete search history.

(56) References Cited

U.S. PATENT DOCUMENTS

| | | | |
|---|---|---|---|
| 7,652,736 | B2 | 1/2010 | Padiyath et al. |
| 8,820,793 | B2 | 9/2014 | Lister |
| 2004/0076908 | A1 | 4/2004 | Oomachi et al. |
| 2009/0101192 | A1 | 4/2009 | Kothari et al. |
| 2010/0220381 | A1 | 9/2010 | Frazier |
| 2011/0101670 | A1 | 5/2011 | Heim |
| 2012/0003449 | A1 | 1/2012 | Yializis et al. |
| 2013/0280506 | A1 | 10/2013 | Bain et al. |
| 2014/0168742 | A1 | 6/2014 | Hashimura et al. |
| 2014/0226021 | A1 | 8/2014 | Koechlin et al. |

FOREIGN PATENT DOCUMENTS

| | | |
|---|---|---|
| WO | WO-1999/067093 A1 | 12/1999 |
| WO | WO-2015/017722 A2 | 2/2015 |

OTHER PUBLICATIONS

Hiep, H. M., et al., "An Interference Localized Surface Plasmon Resonance Biosensor Based on the Photonic Structure of Au Nanoparticles and $SiO_2$/Si Multilayers," ACS Nano, vol. 3, No. 2, pp. 446-452 (Feb. 4, 2009).

International Search Report and Written Opinion issued by the U.S. Patent and Trademark Office as International Searching Authority for International Application No. PCT/US16/50378 dated Dec. 12, 2016 (12 pages).

Jimenez-Solano, A., et al., "Integration of Gold Nanoparticles in Optical Resonators," Langmuir, vol. 28, No. 24, pp. 9161-9167 (Apr. 27, 2012).

Kubo, S., et al., "Tunability of the Refractive Index of Gold Nanopraticle Dispersions," Nano Letters, vol. 7, No. 11, pp. 3418-3423 (Oct. 3, 2007).

Sanchez-Sobrado, O., et al., "Interplay of Resonant Cavity Modes with Localized Surface Plasmons: Optical Absorption Properties of Bragg Stacks Integrating Gold Nanoparticles," Advanced Materials, vol. 23, Issue, 18, pp. 2108-2112 (May 10, 2011).

Shukla, S., et al., "Large-Area, Near-Infrared (IR) Phontonic Crystals with Colloidal Gold Nanoparticles Embedding," Applied Materials and Interfaces, vol. 2, No. 4, pp. 1242-1246 (Apr. 2010).

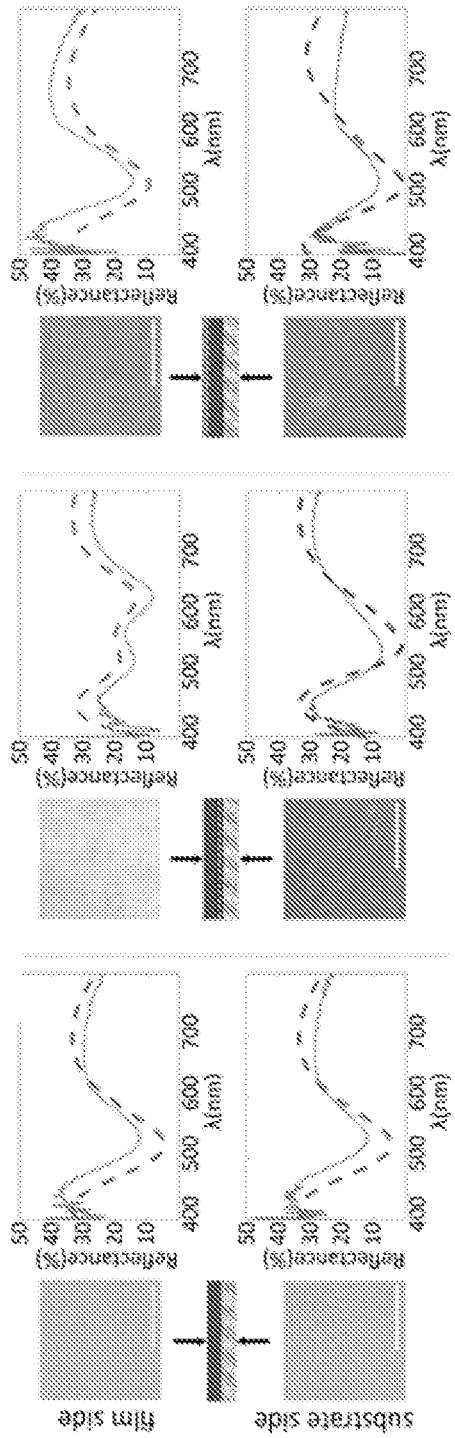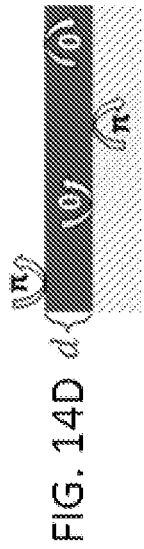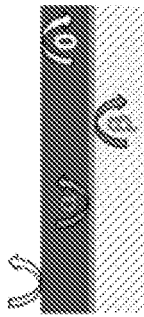
FIG. 14A  FIG. 14B  FIG. 14C  FIG. 14D  FIG. 14E

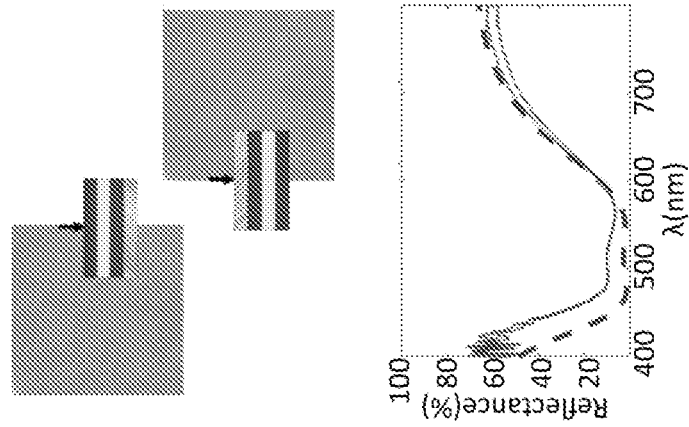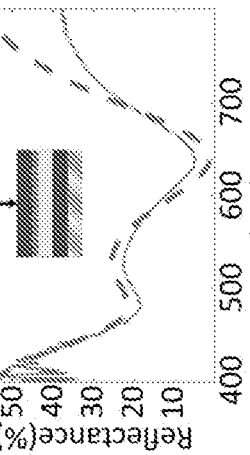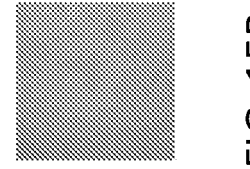
FIG. 15A  FIG. 15B  FIG. 15C

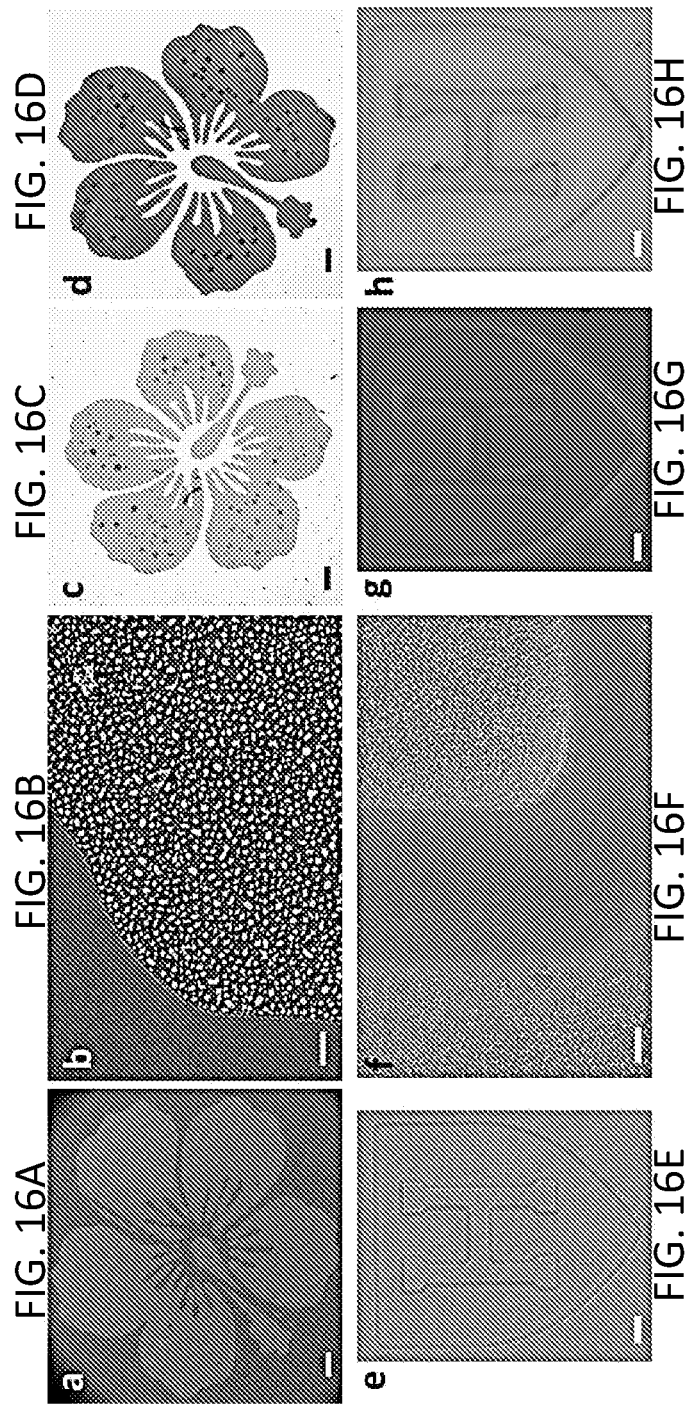

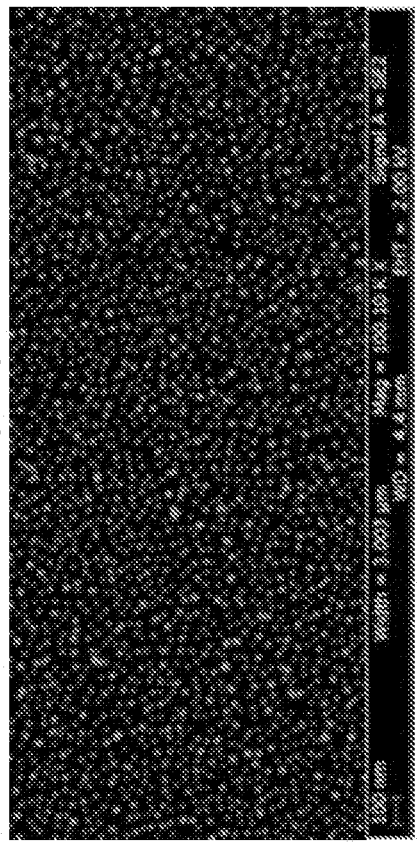
FIG. 18A
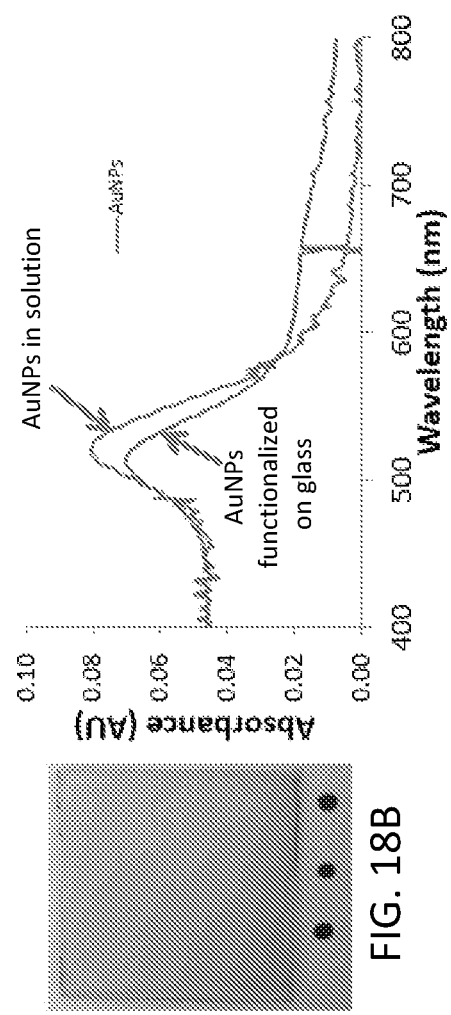
FIG. 18B
FIG. 18C

MODIFYING OPTICAL PROPERTIES OF THIN FILM STRUCTURES USING AN ABSORBING ELEMENT

CROSS-REFERENCES TO RELATED APPLICATIONS

This patent application claims the benefit of the earlier filing date of International Patent Application No. PCT/US2016/050378, filed on Sep. 6, 2016, which claims the benefit of U.S. Provisional Patent Application No. 62/214,508, filed Sep. 4, 2015, and titled "Modifying Optical Properties of Thin-Films Using Nanoparticles with Plasmon Resonance," the contents of which are hereby incorporated by reference in their entirety.

FIELD OF INVENTION

This invention relates to thin film structures that include an absorbing layer with a complex refractive index, and that have a visually different appearance when viewed from a first side as compared with a second side. Methods of fabricating such structures are also described.

SUMMARY

In some embodiments, a method of making a multi-layered film includes providing a transparent substrate having a first side and a second side, depositing a plurality of thin film layers on the first side of the substrate, wherein the plurality of the thin film layers are transparent and two adjacent layers of said plurality of thin film layers have different refractive indices, and depositing a plurality of absorbing elements metal nanoparticles having plasmon resonance (i.e., that exhibit plasmon resonance when electrons thereof are excited) at an interface formed between two adjacent layers of said plurality of thin film layers or formed by the first side of the substrate and a layer of said plurality of thin film layers. The plurality of absorbing elements absorb selected wavelengths of incident light and reflect part of the incident light after inducing a phase shift. The location of the interface where the plurality of absorbing elements are deposited is selected to provide desired wavelengths of absorbed and reflected light; and the multi-layered film has a first appearance when viewed from the first side of the substrate and a second appearance when viewed from the second side of the substrate. In some embodiments, the absorbing elements comprise metal nanoparticles having (i.e., exhibiting) a complex refractive index. Additionally or alternatively, the absorbing elements can comprise a thin film having (i.e., exhibiting) plasmon resonance.

In some embodiments, the wavelengths of light absorbed and the phase shift are dependent on the number and thickness of layers in the plurality of thin film layers. In some embodiments, each layer of the plurality of thin film layers has a thickness of less than 800 nm, or less than 400 nm, or in the range of 70 nm to 135 nm.

In some embodiments, the substrate is made of made of glass, quartz, metal oxides, mixed transition metal oxides, metal nitrides, or polymers.

In some embodiments, the substrate is made of silicon oxide, antimony tin oxide, zinc oxide, aluminum doped zinc oxide, vanadium oxide, titanium oxide, tin oxide, indium tin oxide, polyethylene, polypropylene, polycarbonate, polymethylmethacrylate, cellulose acetate butyrate, polyethylene terephthalate, polyvinyl chloride, polysulfone, polysaccharides, or proteins.

In some embodiments, the plurality of thin film layers is made of glass, quartz, metal oxides, mixed transition metal oxides, metal nitrides, polymers, dielectric nanoparticles, or composites of polymers with nanoparticles fillers.

In some embodiments, the plurality of thin film layers is made of silicon oxide, antimony tin oxide, zinc oxide, aluminum doped zinc oxide, vanadium oxide, titanium oxide, tin oxide, indium tin oxide, polyethylene, polypropylene, polycarbonate, polymethylmethacrylate, cellulose acetate butyrate, polyethylene terephthalate, polyvinyl chloride, polysulfone, polysaccharides, proteins, dielectric nanoparticles, or composites of polymers with nanoparticles fillers.

In some embodiments, the plurality of absorbing elements comprises gold nanoparticles.

In some embodiments, the plurality of absorbing elements comprises a transition metal, a transition metal complex, a metal alloy, a metalloid, a metal oxide, a metal nitride, a metal sulfide, or a molecular absorber (e.g., zinc, tungsten oxide, etc.).

In some embodiments, the plurality of absorbing elements comprises a transition metal, a transition metal complex, a metal alloy, a metalloid, a metal oxide, a metal nitride, a metal sulfide, or a molecular absorber. For example, the plurality of absorbing elements can comprise gold, germanium, molybdenum disulphide, a molecular absorber (e.g., perylene diimide, porphyrins, etc.), silver, platinum, copper, copper alloys, aluminum, aluminum alloys, tungsten, tungsten oxide, tungsten alloys, titanium nitride, chromium, and/or nickel metal. In some such embodiments, the absorbing elements are nanoparticles.

In some embodiments, the plurality of absorbing elements includes nanoparticles, where each nanoparticle can have a shape that is spherical, cylindrical, oblong, prismatic, ellipsoidal, disc, irregular, or acicular in shape.

In some embodiments, the plurality of absorbing elements comprises a thin film. The thin film can be deposited by e-beam evaporation, thermal evaporation, sputtering, electrodeposition, electroless deposition, self-assembled monolayer formation, spin coating, dip coating, reel-to-reel application, doctor blading, inkjet printing, transfer printing, spray coating, tape coating, roll coating, atomic layer deposition, chemical vapor deposition, layer-by-layer deposition or laser ablation.

In some embodiments, the plurality of absorbing elements comprises a thin film which has been heat treated to cause it to break into nanoparticles.

In some embodiments, each absorbing element of the plurality of absorbing elements comprises an interior core and an exterior shell and the material of the interior core and the exterior shell are different. In some such embodiments, the interior core comprises a transition metal, a transition metal complex, a metal alloy, a metalloid, a metal oxide, a metal nitride, a metal sulfide, or a molecular absorber. For example, the interior core can comprise gold, germanium, molybdenum disulphide, a molecular absorber, iron, zinc, cadmium, tin, cobalt, iridium, zirconium, osmium, neodymium, palladium, manganese, silver, platinum, copper, copper alloys, aluminum, aluminum alloys, tungsten, tungsten oxide, tungsten alloys, titanium nitride, chromium, or nickel. In some other embodiments, the exterior shell comprises SiN, SiO$_2$, SiC, titania, polymeric materials or combinations thereof. In some embodiments, the exterior shell comprises gold. In some embodiments, the exterior shell comprises a transition metal, a transition metal complex, a metal alloy, a metalloid, a metal oxide, a metal nitride, a metal sulfide, or a molecular absorber. For example, the exterior shell can comprise germanium, molybdenum disulphide, a molecular absorber, iron, zinc, cadmium, tin, cobalt, iridium, zirconium, osmium, neodymium, palladium, manganese, silver, platinum, copper, copper alloys, aluminum, aluminum alloys, tungsten, tungsten oxide, tungsten alloys, titanium nitride, chromium, or nickel. In some embodiments, the interior core comprises SiN, $SiO_2$, SiC, titania, polymeric materials or combinations thereof.

In some embodiments, each absorbing element of the plurality of absorbing elements comprises a stack of concentric shells, wherein the stack of concentric shells comprises a plurality of adjacent layers with the adjacent layers made of a first material and a second material, wherein the first material and the second material are different. In some embodiments, the first material comprises gold. Alternatively or in addition, the first material can comprise a transition metal, a transition metal complex, a metal alloy, a metalloid, a metal oxide, a metal nitride, a metal sulfide, or a molecular absorber. For example, the first material can comprise germanium, molybdenum disulphide, a molecular absorber, iron, zinc, cadmium, tin, cobalt, iridium, zirconium, osmium, neodymium, palladium, manganese, silver, platinum, copper, copper alloys, aluminum, aluminum alloys, tungsten, tungsten oxide, tungsten alloys, titanium nitride, chromium, or nickel. In some other embodiments, the second material comprises SiN, $SiO_2$, SiC, titania, polymeric materials or combinations thereof.

In some embodiments, one or more of the plurality of thin film layers have a refractive index of about 1.9.

In some embodiments, one or more of the plurality of thin film layers have a refractive index of about 1.45.

In some embodiments, the plurality of absorbing elements forms a non-patterned film.

In some embodiments, at least one of the plurality of thin film layers is discontinuous. In some other embodiments, at least one of the plurality of thin film layer form an irregular array. In some other embodiments, at least one of the plurality of thin film layer form a regular array.

In some embodiments, at least one thin film layer of the plurality of thin film layers is continuous.

In some embodiments, said depositing a plurality of thin film layers is carried out using spin coating, spray coating, layer-by-layer deposition, chemical vapor deposition, atomic layer deposition, thermal evaporation, e-beam evaporation, sputter coating, plasma polymerization, doctor blading, surface-initiated polymerizations, grafting onto and grafting from processes, or anodization of metals to form metal oxides.

In some embodiments, the said depositing a plurality of metal nanoparticles is carried out using carried out using microcontact printing, patterning self-assembled monolayers, physical masking, selective dewetting, selective etching of adhesion promoting layer, selective removal of nanoparticle deposition, painting, spray coating through a mask, inkjet printing, doctor blading, transfer printing, electrodeposition, spin coating, spray coating, dip coating, reel-to-reel application, tape coating, roll coating, electrodeposition, electroless deposition, annealing of the evaporated metal layer or laser ablation.

In some embodiments, the plurality of metal nanoparticles are deposited first on the transparent substrate followed by the deposition of the plurality of thin film layers above the plurality of metal nanoparticles. In some other embodiments, the plurality of metal nanoparticles are treated with a coupling agent to improve adhesion with the transparent substrate or the interface. In some embodiments, the interface is treated with a coupling agent to improve adhesion with the metal nanoparticles. In certain other embodiments, the interface is treated with an organofunctional silane to promote adhesion with the metal nanoparticles. In certain other embodiments, the organofunctional silane is 3-aminopropyltriethoxysilane.

In some embodiments, a method of making a multi-layered film includes providing a transparent substrate having a first side and a second side; depositing a plurality of thin film layers on the first side of the substrate; wherein the plurality of the thin film layers are transparent and two adjacent layers of said plurality of thin film layers have different refractive indices; depositing a plurality of absorbing elements (or "absorbers") having plasmon resonance at an interface formed between two adjacent layers of said plurality of thin film layers or formed by the first side of the substrate and a layer of said plurality of thin film layers; wherein the plurality of absorbing elements forms a patterned film; wherein the plurality of absorbing elements absorbs selected wavelengths of incident light and reflects part of the incident light after inducing a phase shift; wherein the location of the interface where the plurality of absorbing elements is deposited is selected to provide desired wavelengths of absorbed and reflected light; and wherein the multi-layered film has a first appearance when viewed from the first side of the substrate and a second appearance when viewed from the second side of the substrate. In some other embodiments, the metal nanoparticles form an irregular array. In some other embodiments, the metal nanoparticles form a regular array. In some other embodiments, the plurality of absorbing elements is deposited by a process selected from the group consisting of microcontact printing, patterning self-assembled monolayers, physical masking, selective dewetting, selective etching of adhesion promoting layer, selective removal of nanoparticle deposition, painting, spray coating through a mask, inkjet printing, doctor blading, transfer printing, electrodeposition, spin coating, spray coating, dip coating, reel-to-reel application, tape coating, roll coating, electrodeposition, electroless deposition, annealing of the evaporated metal layer or laser ablation.

In some embodiments, the plurality of absorbing elements forms a non-patterned film. At least one of the plurality of thin film layers can be discontinuous, and forms an irregular array or a regular array. At least one of the plurality of thin film layers can be continuous.

In some embodiments, depositing the plurality of thin film layers is carried out using spin coating, spray coating, layer-by-layer deposition, chemical vapor deposition, atomic layer deposition, thermal evaporation, e-beam evaporation, sputter coating, plasma polymerization, doctor blading, surface-initiated polymerizations, grafting onto and grafting from processes, or anodization of metals to form metal oxides.

In some embodiments, depositing the plurality of absorbing elements is carried out using microcontact printing, patterning self-assembled monolayers, physical masking, selective dewetting, selective etching of adhesion promoting layer, selective removal of nanoparticle deposition, painting, spray coating through a mask, inkjet printing, doctor blading, transfer printing, electrodeposition, spin coating, spray coating, dip coating, reel-to-reel application, tape coating, roll coating, electrodeposition, electroless deposition, annealing of the evaporated metal layer or laser ablation.

The plurality of absorbing elements can be deposited first on the transparent substrate, followed by the deposition of the plurality of thin film layers above the plurality of absorbing elements. The interface can be treated with a coupling agent to improve adhesion with the absorbing elements. For example, the interface can be treated with an organofunctional silane, such as 3-aminopropyltriethoxysilane, to promote adhesion with the absorbing elements.

In some embodiments, the plurality of absorbing elements is treated with a coupling agent to improve adhesion with the transparent substrate or the interface.

In an aspect a multi-layered film includes a transparent substrate having a first side and a second side; a plurality of distinct thin film layers on the first side of the substrate; wherein the plurality of the thin film layers are transparent and the adjacent distinct thin film layers have different refractive indices; a plurality of absorbing elements having plasmon resonance at an interface formed between two adjacent layers of said plurality of thin film layers or formed by the first side of the substrate and a layer of said plurality of thin film layers. The plurality of absorbing elements absorbs selected wavelengths of incident light and reflects part of the incident light after inducing a phase shift. The location of the interface where the plurality of absorbing elements is deposited is selected to provide desired wavelengths of absorbed and reflected light; and the multi-layered film has a first appearance when viewed from the first side of the substrate and a second appearance when viewed from the second side of the substrate.

In some embodiments, the wavelengths of light absorbed and the phase shift are further dependent on the number and thickness of the plurality of thin layers. In some other embodiments, the plurality of thin film layer have a thickness of less than 800 nm, or less than 400 nm, or in the range of 70 nm to 135 nm.

In some embodiments, the substrate is made of made of glass, quartz, metal oxides, mixed transition metal oxides, metal nitrides, or polymers.

In some embodiments, the substrate is made of silicon oxide, antimony tin oxide, zinc oxide, aluminum doped zinc oxide, vanadium oxide, titanium oxide, tin oxide, indium tin oxide, polyethylene, polypropylene, polycarbonate, polymethylmethacrylate, cellulose acetate butyrate, polyethylene terephthalate, polyvinyl chloride, polysulfone, polysaccharides or proteins.

In some embodiments, the plurality of thin film layers is made of glass, quartz, metal oxides, mixed transition metal oxides, metal nitrides, polymers, dielectric nanoparticles, or composites of polymers with nanoparticles fillers.

In some embodiments, the plurality of thin film layers is made of silicon oxide, antimony tin oxide, zinc oxide, aluminum doped zinc oxide, vanadium oxide, titanium oxide, tin oxide, indium tin oxide, polyethylene, polypropylene, polycarbonate, polymethylmethacrylate, cellulose acetate butyrate, polyethylene terephthalate, polyvinyl chloride, polysulfone, polysaccharides, proteins, dielectric nanoparticles, or composites of polymers with nanoparticles fillers.

In some embodiments, an absorbing element of the plurality of absorbing elements comprises gold.

In some embodiments, the plurality of absorbing elements comprises germanium, molybdenum disulphide, a molecular absorber, iron, zinc, cadmium, tin, cobalt, iridium, zirconium, osmium, neodymium, palladium, manganese, silver, platinum, copper, copper alloys, aluminum, aluminum alloys, tungsten, tungsten oxide, tungsten alloys, titanium nitride, chromium, or nickel.

In some embodiments, absorbing elements of the plurality of absorbing elements are spherical, cylindrical, oblong, prismatic, ellipsoidal, disc, irregular or acicular, in shape.

In some embodiments, absorbing elements of the plurality of absorbing elements comprise an interior core and an exterior shell and the material of the interior core and the exterior shell are different. In some such embodiments, the interior core comprises gold. In some other embodiments, the interior core comprises germanium, molybdenum disulphide, a molecular absorber, iron, zinc, cadmium, tin, cobalt, iridium, zirconium, osmium, neodymium, palladium, manganese, silver, platinum, copper, copper alloys, aluminum, aluminum alloys, tungsten, tungsten oxide, tungsten alloys, titanium nitride, chromium, or nickel. In some other embodiments, the exterior comprises SiN, $SiO_2$, SiC, titania, polymeric materials or combinations thereof. In some other embodiments, the exterior shell comprises gold. In some other embodiments, the exterior shell comprises germanium, molybdenum disulphide, a molecular absorber, iron, zinc, cadmium, tin, cobalt, iridium, zirconium, osmium, neodymium, palladium, manganese, silver, platinum, copper, copper alloys, aluminum, aluminum alloys, tungsten, tungsten oxide, tungsten alloys, titanium nitride, chromium, or nickel. In some other embodiments, interior core comprises SiN, $SiO_2$, SiC, titania, polymeric materials or combinations thereof.

In some embodiments, the plurality of absorbing elements comprises a stack of concentric shells, wherein the stack of concentric shells comprises a plurality of adjacent layers with the adjacent layers made of a first material and a second material, wherein the first material and the second material are different. In some such embodiments, the first material comprises gold. Alternatively or in addition, the first material can comprise a transition metal, a transition metal complex, a metal alloy, a metalloid, a metal oxide, a metal nitride, a metal sulfide, or a molecular absorber. For example, the first material can comprise germanium, molybdenum disulphide, a molecular absorber, iron, zinc, cadmium, tin, cobalt, iridium, zirconium, osmium, neodymium, palladium, manganese, silver, platinum, copper, copper alloys, aluminum, aluminum alloys, tungsten, tungsten oxide, tungsten alloys, titanium nitride, chromium, or nickel. In some other embodiments, the second material comprises SiN, $SiO_2$, SiC, titania, polymeric materials or combinations thereof.

In some embodiments, one or more of the plurality of thin film layers have a refractive index of around 1.9.

In some embodiments, one or more of the plurality of thin film layers have a refractive index of around 1.45.

In some embodiments, the plurality of absorbing elements forms a non-patterned film.

In some embodiments, at least one of the plurality of thin film layers is discontinuous.

In some embodiments, at least one of the plurality of thin film layers is discontinuous. In some other embodiments, at least one of the plurality of thin film layer form an irregular array. In some other embodiments, at least one of the plurality of thin film layer form a regular array. In some other embodiments, at least one of the plurality of thin film layers is continuous.

In some embodiments, the plurality of absorbing elements are treated with a coupling agent to improve adhesion with the transparent substrate or the interface. The absorbing elements can comprise noble metal nanoparticles.

In some embodiments, the interface is treated with a coupling agent to improve adhesion with the absorbing elements.

In some embodiments, the interface is treated with an organofunctional silane to promote adhesion with the absorbing elements. In some other embodiments, wherein the organofunctional silane is 3-aminopropyltriethoxysilane.

In an aspect, a multi-layered film includes a transparent substrate having a first side and a second side; a plurality of distinct thin film layers on the first side of the substrate; wherein the plurality of the thin film layers are transparent and the adjacent distinct thin film layers have different refractive indices; a plurality of absorbing elements having plasmon resonance at an interface formed between two adjacent layers of said plurality of thin film layers or formed by the first side of the substrate and a layer of said plurality of thin film layers; wherein the plurality of absorbing elements forms a patterned film; wherein the plurality of absorbing elements absorbs selected wavelengths of incident light and reflect part of the incident light after inducing a phase shift; wherein the location of the interface where the plurality of absorbing elements is deposited is selected to provide desired wavelengths of absorbed and reflected light; and wherein the multi-layered film has a first appearance when viewed from the first side of the substrate and a second appearance when viewed from the second side of the substrate.

In some embodiments, the plurality of absorbing elements forms an irregular array. In some other embodiments, the plurality of absorbing elements forms a regular array. The plurality of absorbing elements can be deposited by a process selected from the group consisting of: microcontact printing, patterning self-assembled monolayers, physical masking, selective dewetting, selective etching of adhesion promoting layer, selective removal of nanoparticle deposition, painting, spray coating through a mask, inkjet printing, doctor blading, transfer printing, electrodeposition, spin coating, spray coating, dip coating, reel-to-reel application, tape coating, roll coating, electrodeposition, electroless deposition, annealing of the evaporated metal layer and laser ablation.

BRIEF DESCRIPTION OF DRAWINGS

The above and other objects and advantages of the present disclosure will be apparent upon consideration of the following detailed description, taken in conjunction with the accompanying drawings, in which like reference characters refer to like parts throughout.

FIG. 9A shows the generic optical structure coupling modes A, B, and C with scattering matrix S;

FIG. 9B shows the scattering matrix equation with reciprocity requirement: $S_{ij}=S_{ji}$;

FIG. 14A shows photographic images of the front and back of a titania thin film on a glass substrate, as well as corresponding plots of simulated (dashed) and measured (solid) reflectance spectra, according to some embodiments;

FIG. 14B shows a photographic image of the front and back of a titania thin film on a glass substrate with gold nanoparticles located at the substrate/thin film interface, as well as corresponding plots of simulated (dashed) and measured (solid) reflectance spectra, according to some embodiments;

FIG. 14C shows a photographic image of the front and back of a titania thin film on a glass substrate with gold nanoparticles located at the air/thin film interface, as well as corresponding plots of simulated (dashed) and measured (solid) reflectance spectra, according to some embodiments;

FIG. 14D illustrates phase changes of 0 and $2\pi$ upon external and internal reflections of a dielectric layer, according to some embodiments;

FIG. 14E illustrates phase changes of 0 and $2\pi$ upon external and internal reflections of a dielectric film deposited on an absorbing layer, according to some embodiments;

FIG. 15A shows a photographic image of a titania/silica/titania 3-layer multilayer with absorbing gold nanoparticles between the $2^{nd}$ and $3^{rd}$ layers, as well as a corresponding plot of simulated (dashed) and measured (solid) spectra of the sample viewed from the coating side.

FIG. 15B shows a photographic image of a titania/silica/titania 3-layer multilayer with absorbing gold nanoparticles between the $2^{nd}$ and $3^{rd}$ layers, as well as a corresponding plot of simulated (dashed) and measured (solid) spectra of the sample viewed from the substrate side.

FIG. 15C shows photographic images of a sample containing no gols nanoparticles with the same layers as FIGS. 15A-15B on a glass substrate, as well as a corresponding plot of simulated (dashed) and measured (solid) spectra of the sample measured from both sides of the sample (bottom).

FIG. 16A shows an SEM image of a single pattern showing the locations of the nanoparticles (bright areas), according to an embodiment;

FIG. 16B is a high-resolution SEM image of the boxed region in FIG. 16A, showing the nanoparticle size distribution;

FIG. 16C is an optical micrograph of the coating side of the patterned layer of gold nanoislands of FIG. 16A, created using a method described herein, according to an embodiment;

FIG. 16D is an optical micrograph of the sample of FIG. 16C, when viewed from the substrate side;

FIG. 16E shows an SEM image of a single pattern without a lift-of step, showing the locations of the nanoislands as being located everywhere except for the edge of the micropattern, according to an embodiment;

FIG. 16F is a high-resolution SEM image of the boxed region in FIG. 16E, showing the nanoparticle size distribution;

FIG. 16G is an optical micrograph of the coating side of the patterned layer of gold nanoislands of FIG. 16E, created using a method described herein, according to an embodiment;

FIG. 16H is an optical micrograph of the sample of FIG. 16G, when viewed from the substrate side;

FIG. 18A is an SEM image of gold nanoparticles;

FIG. 18B is an optical image of an approximately 1-inch square glass slide functionalized with plasmonic gold nanoparticles;

FIG. 18C is an absorbance spectra of gold nanoparticles in solution and functionalized on glass;

DETAILED DESCRIPTION

Figure 1:
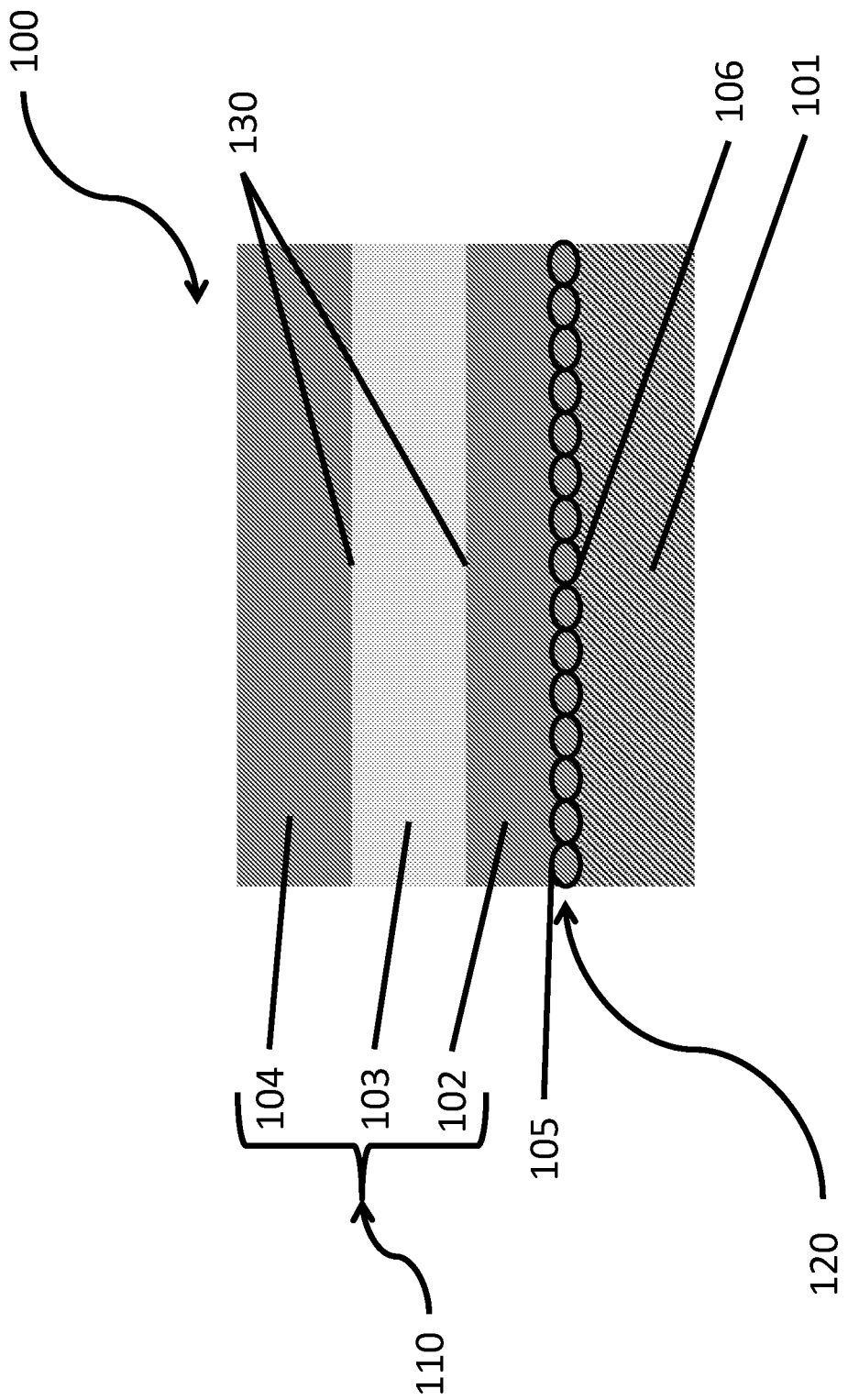
FIG. 1 shows a multi-layered film including a transparent substrate having a first side and a second side; a plurality of distinct thin film layers on the first side of the substrate and a plurality of noble metal nanoparticles having plasmon resonance.

For thousands of years, humans have been fascinated with the panoply of colors found in nature, and have sought to create materials that exhibit these colors in a variety of ways. Throughout this time, there has been continual improvement in the ability to fabricate and understand the underlying physics of these structures, from the $4^{th}$ century Roman Lycurgus cup, showing different color in reflection and transmission, to the inspiring coloration of ancient church windows, and modern effect pigments that use sparkle, luster and color travel to create vivid coloration. Aesthetics and function are often intimately linked in modern materials. Examples can be found in materials that change color to indicate structural fatigue in bridges, buildings, or airplane wings or modify transparency to allow for energy savings, as well as in the fields of anti-counterfeiting, solar energy harvesting, modulation of absorption and thermal emission, and colorimetric sensing.

Generally, the coloration of a material results from a combination of absorption, reflection, and scattering. Absorption of light in a given wavelength range leads to a macroscopic color; for example, by electronic excitations in dyes or plasmonic resonances in noble metal nanoparticles. Alternatively, micro-to-nano-scale structured materials can enable optical interference phenomena, resulting in structural coloration. Examples of structural coloration abound in natural species, and can also be found in synthetic photonic structures such as diffraction gratings, colloidal crystals, and multilayer stacks.

The combination of structural coloration and absorption can improve color saturation and create entirely novel color effects. In the simplest case, absorbers—whether dyes or plasmonic absorbers—are used to purify the spectrum of structurally colored materials, especially by distributing an absorber homogeneously throughout the material. More importantly, the controlled localization of the absorbing moieties within a composite architecture can provide avenues for completely new optical effects. The potential of achieving surprising optical effects from rationally designed combinations of absorbing and dielectric material has been demonstrated in several systems, including ultra-thin perfect absorbers, ultra-thin-film semi-conductor/metal structural color materials, anti-reflective coatings, structural color saturation adjustment, and asymmetric reflection materials. Strikingly, asymmetric absorption properties can arise from the combination of an absorbing layer with a thin film. In particular, Butun & Aydin have demonstrated asymmetric absorption properties at specific wavelengths in a metamaterial with precisely controlled plasmonic properties by combining two structural color elements (a thin film and a plasmonic metamaterial) with an absorbing layer (a film of silver). A material with such an asymmetric absorption spectrum, by conservation of energy, must have an asymmetric reflection spectrum; by generalizing the system of a structural color material and an absorbing layer which can impart an anomalous phase shift (one different from 0 or $\pi$) on the reflected light, we can rationally design the reflected color from one side of the material to be arbitrarily different from the reflected color from the opposite side.

Here, we take advantage of the anomalous phase shift upon reflection from an absorbing material interface to create semitransparent coatings that exhibit different reflected colors depending on the viewing direction. In analogy to "Janus particles," which feature different chemical compositions on either side, we will refer to these materials as optical Janus materials to highlight the asymmetric nature of their reflection. We investigate the underlying physical origin of the observed effect, provide general design guidelines to create coatings with arbitrary reflection colors from each side, and use patterning techniques to create optical Janus patterns with viewing direction-dependent optical properties.

A multi-layered film including a transparent substrate having a first side and a second side, a plurality of distinct thin film layers on the first side of the substrate, and a plurality of metal nanoparticles having plasmon resonance, along with the method of making the same, is described. The plurality of distinct thin film layers are transparent and include an interface that separates a thin film layer from an adjacent thin film layer or from the first side of the transparent substrate. Additionally, the adjacent thin film layers have different refractive indices. The metal nanoparticles can be deposited on the interface formed between one thin film layer of the plurality of thin film layers and an adjacent thin film layer, and/or the interface formed by a thin film layer of the plurality of thin film layers and the first side of the transparent substrate. The plurality of metal nanoparticles deposited on the interface absorb certain wavelengths of incident light and reflect a part of the wavelength after inducing a phase shift. The absorbed and phase shifted light results in a visually different appearance of the multi layered film when viewed from the first side as compared with the second side of the substrate. The wavelengths of light absorbed and the phase shift induced is dependent on the location of the interface where the plurality of metal nanoparticles are deposited. In some embodiments the wavelengths of light absorbed and the phase shift induced is dependent on the number and/or thickness of the plurality of thin film layers. In certain embodiments, the first side can be the front and the second side can be the back side.

FIG. 1 shows a schematic of a multi-layered film 100 containing a substrate 101 and a plurality of thin film layers 110. In certain embodiments, the plurality of thin film layers 110 include three layers 102, 103, and 104. Although, the figure shows 110 having three layers 102, 103, and 104, it will be apparent to a person of ordinary skill in the art that less or additional layers can be utilized. The materials of 102, 103, and 104 are selected so that the refractive indices of each adjacent layer is different. In other words, although layers 102 and 104 may have identical refractive indices, layer 102 and layer 103 have refractive indices that are different. The metal nanoparticles 105 that have plasmon resonance are deposited to form a nanoparticle coating 120. In certain embodiments, the metal nanoparticles 105 are noble metal nanoparticles. The nanoparticle coating 120 can be disposed at any of the interfaces 130 formed between the layers forming the plurality of thin film layers 110 or the interface 106 formed between the plurality of thin film layers 110 and the substrate 101. In some other embodiments, the nanoparticle coating 120 on any of the interfaces 130 or the interface 106 is continuous.

Figure 2:
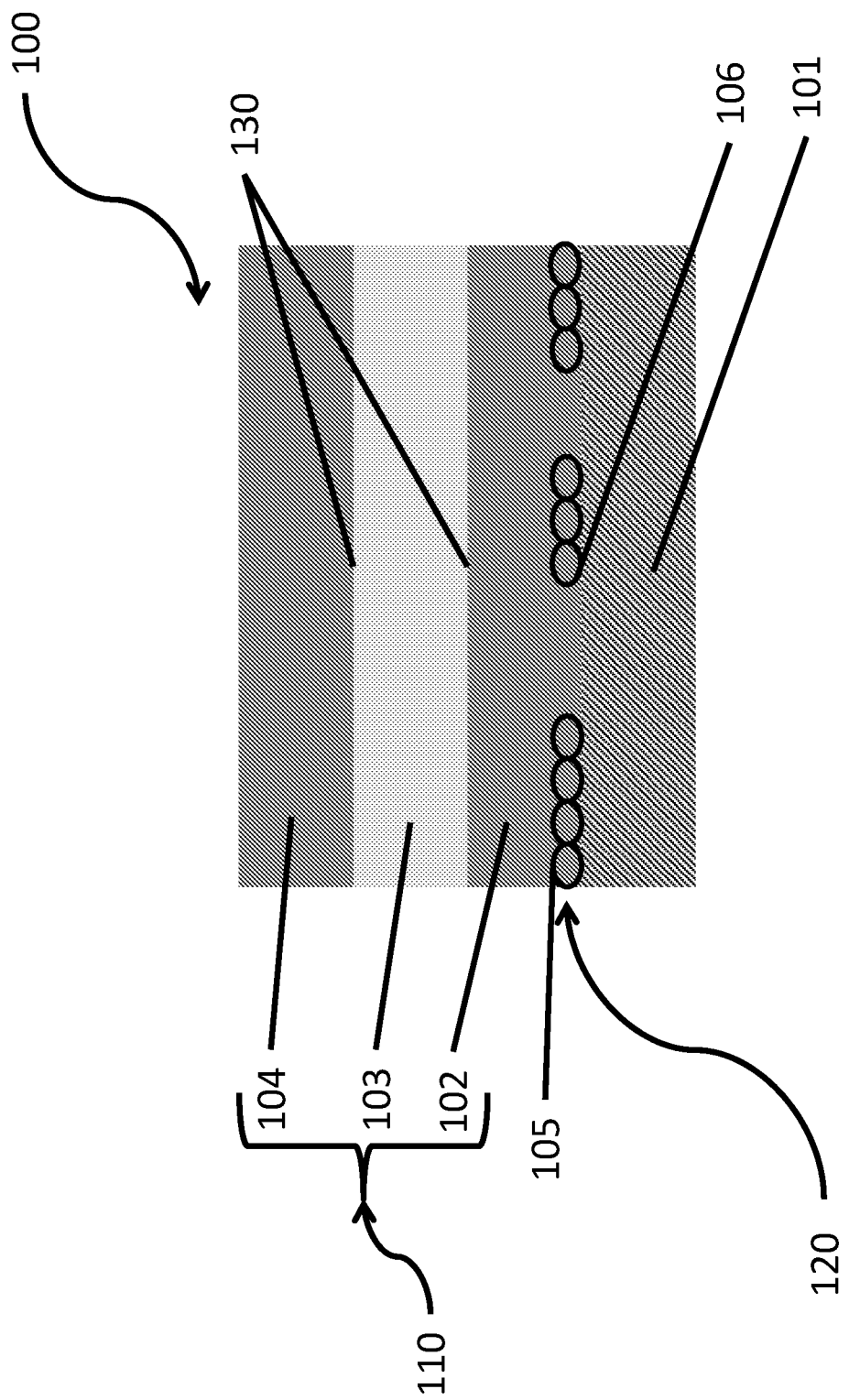
FIG. 2 shows a schematic of a multi-layered film with patterned nanoparticle coating disposed on the interface.

In some embodiments, the nanoparticle coating 120 on any of the interfaces 130 or the interface 106 is patterned. FIG. 2 shows a schematic of a multi-layered film with patterned nanoparticle coating 120 disposed on the interface 106. In some embodiments, the deposition of the metal nanoparticles at the interfaces 130 or interface 106 forms an irregular array. In some other embodiments, the deposition of the metal nanoparticles at the interfaces 130 or interface 106 forms a regular array. In some embodiments, the patterned deposition of the nanoparticle coating 120 is carried out by using microcontact printing, patterning self-assembled monolayers, physical masking, selective dewetting, selective etching of adhesion promoting layer, selective removal of nanoparticle deposition, painting, spray coating through a mask, inkjet printing, doctor blading, transfer printing, electrodeposition, spin coating, spray coating, dip coating, reel-to-reel application, tape coating, roll coating, electrodeposition, electroless deposition, annealing of the evaporated metal layer or laser ablation.

Figure 3:
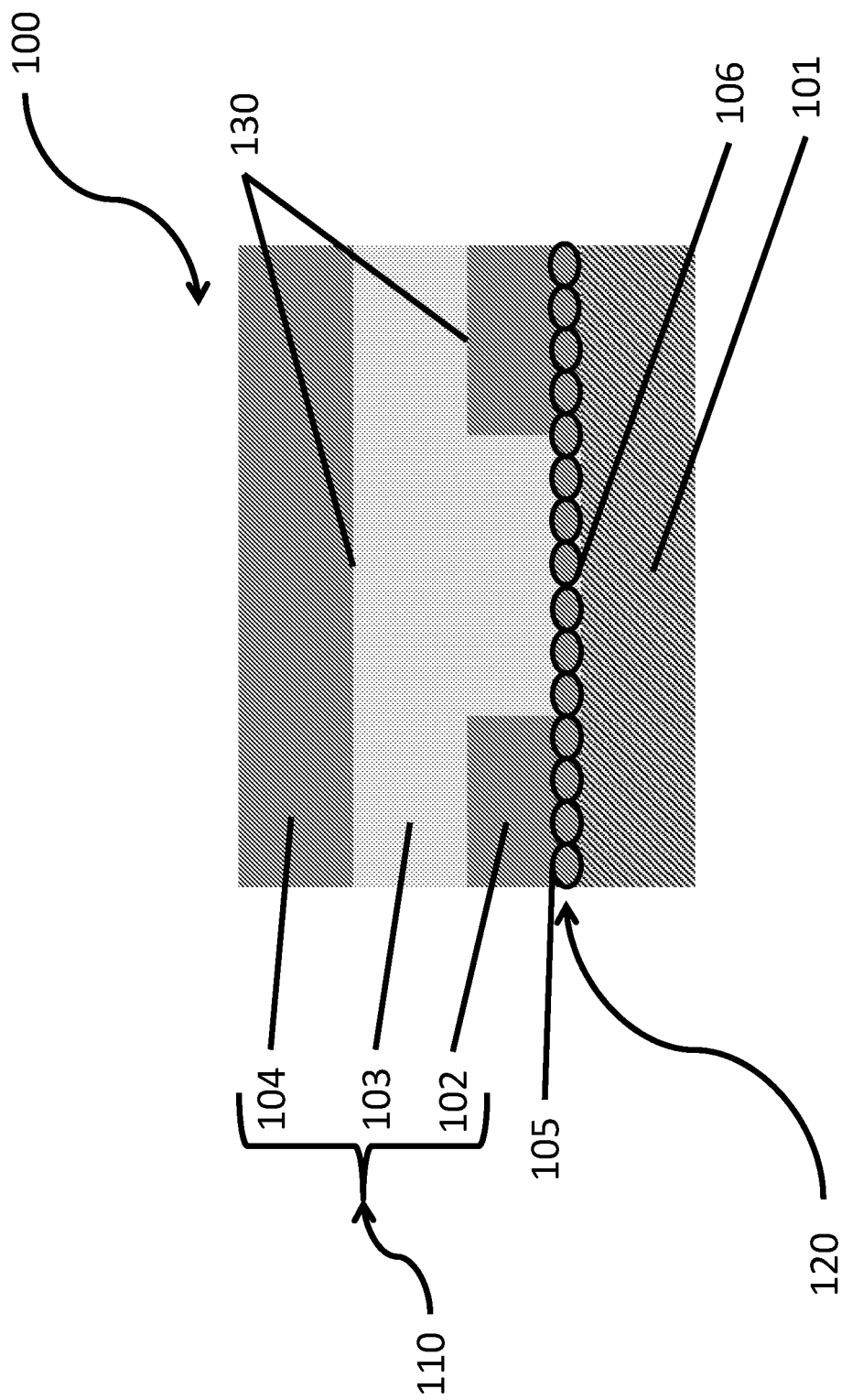
FIG. 3 shows a schematic of a multi-layered film with a thin film layer as discontinuous and material from an adjacent thin film layer filling the areas of discontinuity in the thin film layer having discontinuity.

In some embodiments, at least some of the layers, such as, layers 102, 103, and 104, that form the plurality of thin film layers 110 are discontinuous. FIG. 3 shows a schematic with a discontinuous layer 102 material from layer 103 filling the areas of discontinuity in layer 102. In some embodiments, at least some thin film layers of the plurality of thin film layers 110 form an irregular array (e.g., in-plane and/or out-of-plane with respect to the respective thin film layer(s)). In some other embodiments, at least some of the plurality of thin film layers 110 form a regular array. In some other embodiments, at least some of the layers, such as, layers 102, 103, and 104, that form the plurality of thin film layers 110 are continuous.

Figure 4:
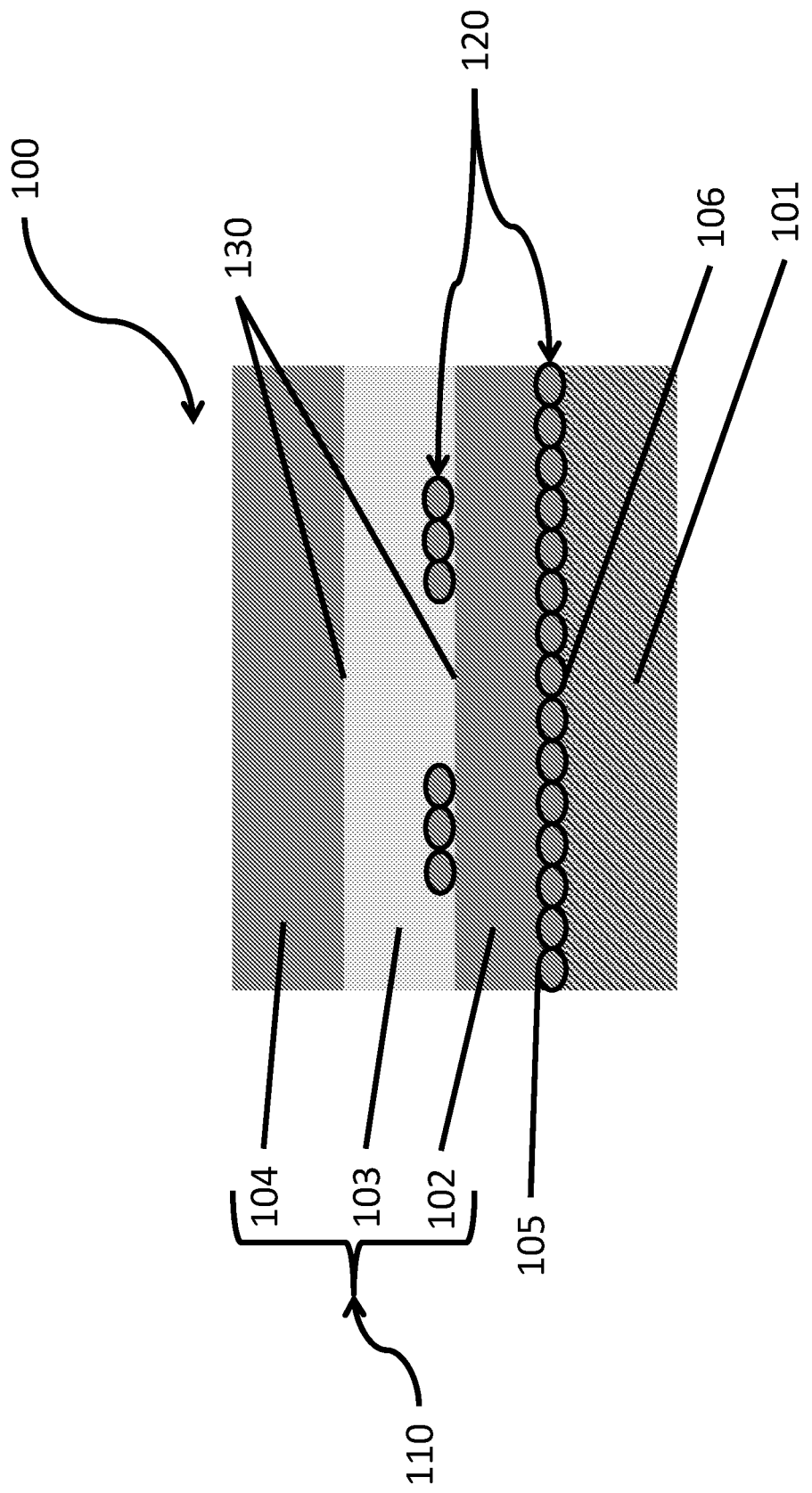
FIG. 4 shows a multi-layered film with the nanoparticle coating deposited on multiple interfaces within the plurality of thin film layers and the interface formed between the thin film layers and the substrate.

In certain embodiments of the multi-layered film 100, the nanoparticle coating 120 is deposited on multiple interfaces 130 and the interface 106. This is shown schematically in FIG. 4. In this illustration, the nanoparticle coating 120 is shown to be discontinuous in the interface formed between layers 102 and 103. In some embodiments, the nanoparticle coating 120 is continuous. In some other embodiments of the multi-layered film, the nanoparticle coating 120 is deposited on one of the interfaces 130 or the interface 106.

The plurality of thin film layers 110 in the multi-layered film 100, include layers such as, layers 102, 103, and 104, which have different refractive indices. In some embodiments of the multi-layered film 100, the plurality of thin film layers 110 include layers such as, layers 102, 103, and 104, one or more of which have a refractive index of about 1.9. In some embodiments of the multi-layered film, the plurality of thin film layers 110 include layers such as, layers 102, 103, and 104, one or more of which have a refractive index of about 1.45.

In some embodiments of the multi-layered film 100, the plurality of thin film layers 110 includes layers, such as, layers 102, 103, and 104, which have a thickness in the range of about 70 nm, to about 135 nm.

In some embodiments, the transparent substrate 101 includes glass, quartz, aluminum oxide, titanium oxide, magnesium oxide, chromium oxide, nickel oxide, zirconium oxide, indium tin oxide, a transition metal oxide, a mixed transition metal oxide, silicon nitride, polyethylene, polypropylene, polycarbonate, polymethylmethacrylate, cellulose acetate butyrate, polyethylene terephthalate, polyvinyl chloride, polysulfone, a polysaccharide such as chitosan, or a protein such as silk fibroin.

In some embodiments, the plurality of thin film layers 110 includes of glass, quartz, aluminum oxide, titanium oxide, magnesium oxide, chromium oxide, nickel oxide, zirconium oxide, indium tin oxide, transition metal oxides, mixed transition metal oxides, silicon nitride, silicon oxide, antimony tin oxide, zinc oxide, aluminum doped zinc oxide, vanadium oxide titanium oxide, tin oxide, indium tin oxide, polyethylene, polypropylene, polycarbonate, polymethylmethacrylate, cellulose acetate butyrate, polyethylene terephthalate, polyvinyl chloride, polysulfone, a polysaccharide such as chitosan, a protein such as silk fibroin, a dielectric nanoparticle, or a composite of polymers with nanoparticle fillers.

In certain embodiments, deposition of one or more of the plurality of thin film layers 110 is carried out using spin coating, spray coating, layer-by-layer deposition, chemical vapor deposition, atomic layer deposition, thermal evaporation, e-beam evaporation, sputter coating, plasma polymerization, doctor blading, surface-initiated polymerizations, grafting onto and grafting from processes, and/or anodization of metals to form metal oxides.

In some embodiments, the metal nanoparticles 105 having plasmon resonance include gold. In some other embodiments, the metal nanoparticles 105 having plasmon resonance include silver, platinum, copper, copper alloys, aluminum, aluminum alloys, tungsten, tungsten oxide, tungsten alloys, titanium nitride, chromium, and/or nickel.

Metal nanoparticles 105 exhibiting plasmon resonance are particles whose electron density can couple with electromagnetic radiation of wavelengths that are far larger than the particle due to the nature of the dielectric-metal interface between the nanoparticles and the medium in which the nanoparticles are disposed. This is unlike pure metals, where there is a maximum limit on what size wavelength can be effectively coupled based on the material size.

Metal nanoparticles 105 having plasmon resonance can exhibit interesting and useful scattering, absorbance, and coupling properties based on their geometries and relative positions.

Plasmons are oscillations of free electrons that are the consequence of the formation of a dipole in the material due to electromagnetic waves. The electrons migrate in the material to restore its initial state; however, the light waves oscillate, leading to a constant shift in the dipole that forces the electrons to oscillate at the same frequency as the light. This coupling only occurs when the frequency of the light is equal to or less than the plasma frequency and is greatest at the plasma frequency that is therefore called the resonant frequency. The scattering and absorbance cross-sections describe the intensity of a given frequency to be scattered or absorbed.

In some embodiments, the metal nanoparticles 105 having plasmon resonance can form clusters and aggregates that exhibit collective electronic states. The symmetry of the metal nanoparticles 105 and the distribution of the electrons within them can affect a type of bonding or antibonding character between the nanoparticles that is similar to that of molecular orbitals. Since light couples with the electrons, polarized light can be used to control the distribution of the electrons. In some embodiments, changing the geometry of the metal nanoparticles 105 having plasmon resonance can be used to control the optical activity and properties of the system, and alternatively the polarized light can have the same effect by lowering the symmetry of the conductive electrons inside the particles and changing the dipole moment of the cluster. Such clusters can be used to control light on the nano scale.

In some embodiments, the metal nanoparticles 105 are spherical, cylindrical, oblong, prismatic, ellipsoidal, discs, irregular, or acicular in shape.

In some embodiments, the metal nanoparticles 105 further include a core and an exterior shell, where the material of the core and the exterior shell are different. In certain embodiments, the interior core is made of gold. In certain other embodiments, the interior core is made of a material that includes silver, platinum, copper, copper alloys, aluminum, aluminum alloys, tungsten, tungsten oxide, tungsten alloys, titanium nitride, chromium, and/or nickel. In certain embodiments, the exterior shell is made of a material selected from the group consisting of SiN, $SiO_2$, SiC, titania, a polymeric material, and combinations thereof. In certain other embodiments, the exterior shell is made of gold. In certain other embodiments, the exterior shell is made of a material that includes silver, platinum, copper, copper alloys, aluminum, aluminum alloys, tungsten, tungsten oxide, tungsten alloys, titanium nitride, chromium, or nickel. In certain embodiments, the interior core is made of a material selected from the group consisting of SiN, $SiO_2$, SiC, titania, polymeric materials and combinations thereof.

In some embodiments the metal nanoparticles 105 includes a stack of concentric shells with the layer of shells forming adjacent layers that are made of different materials. In some embodiments, a first layer included in the adjacent layer comprises gold. In certain other embodiments, the first layer included in the adjacent layer comprises a material that includes germanium, molybdenum disulphide, silver, platinum, copper, copper alloys, aluminum, an aluminum alloy, tungsten, tungsten oxide, a tungsten alloy, a molecular absorber, titanium nitride, chromium, and/or nickel. In certain embodiments, a second layer included in the adjacent layer is made of a material selected from the group consisting of SiN, $SiO_2$, SiC, titania, a polymeric material, and combinations thereof.

In certain embodiments, depositing of the plurality of metal nanoparticles is carried out using spin coating, spray coating, dip coating, reel-to-reel application, tape coating, roll coating, electrodeposition, electroless deposition, or laser ablation.

In some embodiments, the metal nanoparticles are deposited first on the transparent substrate, to form the nanoparticle coating 120, followed by the deposition of the plurality of thin film layers above the nanoparticle coating 120. In some embodiments the metal nanoparticles 105 include noble metal nanoparticles that are treated with a coupling agent to improve adhesion with the transparent substrate.

In some embodiments, one or more of the interfaces 130 within the plurality of thin film layers 110 is treated with a coupling agent to improve adhesion with noble metal nanoparticles 105. In some other embodiments, one or more of the interfaces 130 within the plurality of thin film layers 110 is treated with an organofunctional silane to promote adhesion with the noble metal nanoparticles 105. In some embodiments, the organofunctional silane is 3-aminopropyltriethoxysilane.

Explanation for Difference in the Visual Appearance

Due to the absorption of certain wavelengths of incident light and reflection a part of the wavelength after inducing a phase shift the multi-layered film has a different visual appearance when viewed from the first side and the second side. Without being bound by theory, the difference in the visual appearance observed in the multi-layered films may be explained as set forth below.

Reciprocity and Time Reversal Symmetry:

When there is no absorption in an optical structure, reflection efficiency is the same in both directions of the object. This is denoted by reciprocity relationship $S_{ij}=S_{ji}$. Additionally, non-absorbing optical structures have an additional time-reversal symmetry. This results in the same visual appearance when the optical structure is viewed from a first and from a second side.

Figures 9A, 9B:
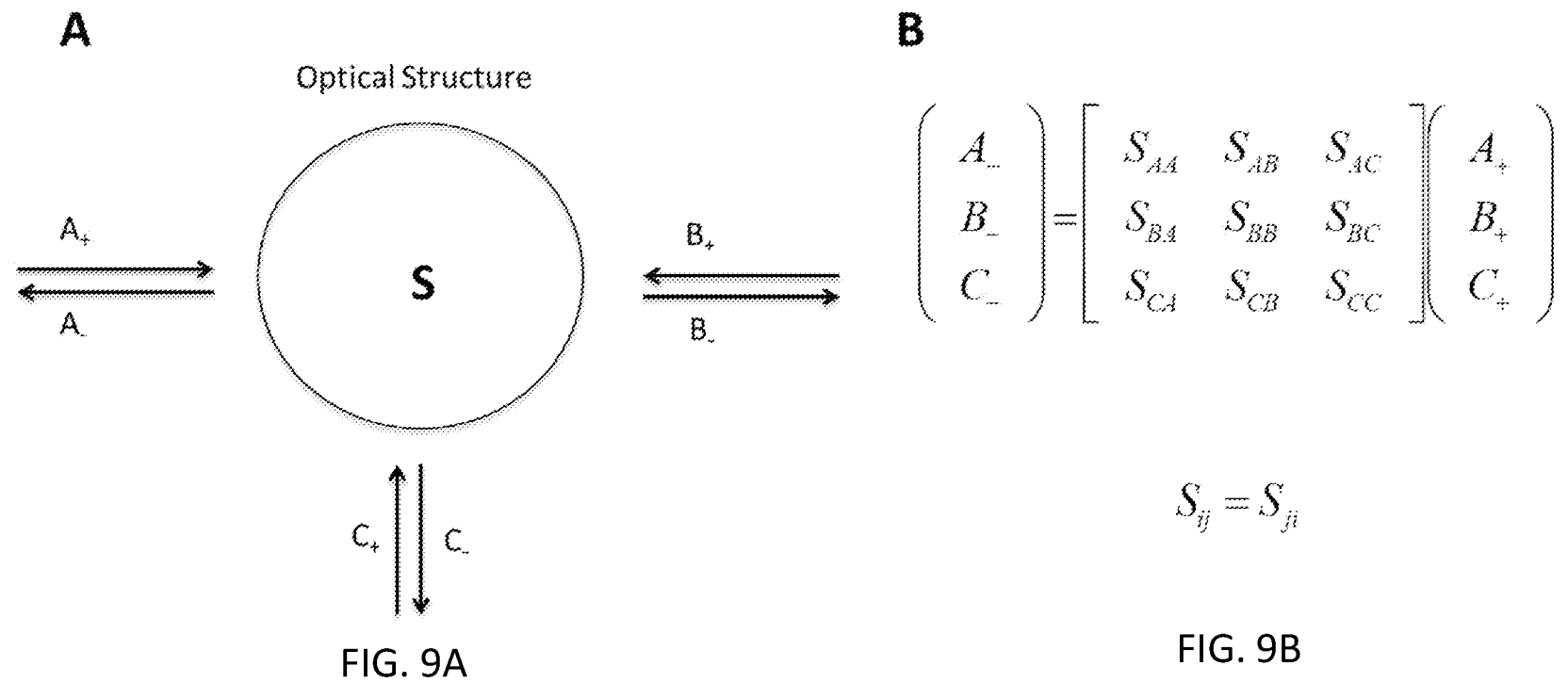

FIG. 9A shows the generic optical structure coupling modes A, B, and C with scattering matrix S. FIG. 9B shows the scattering matrix equation with reciprocity relationship: $S_{ij}=S_{ji}$. The scattering matrix must be symmetric for all structures containing only materials with linear, symmetric and time-invariant dielectric tensors. This means that modes couple to each other symmetrically (e.g., $A_+ \rightarrow B_-$ with the same efficiency that $B_+ \rightarrow A_-$).

All optical structures made of linear materials whose dielectric tensor is both symmetric and static in time (or where permittivity and permeability are time-invariant and either scalars or symmetric tensors) satisfy Lorentz's reciprocity theorem, which requires a structure's scattering matrix to be symmetric. This theorem effectively says that if the structure couples a given incoming mode M1 to an outgoing mode M2 with efficiency E, then time-reversed M2 will scatter to time-reversed M1 with the same efficiency E. Importantly, adding linear loss (e.g., due to the presence of an absorbing material) without any of the above properties (e.g. nonsymmetric or time-varying permittivity or permeability tensors) does not change the Lorentz reciprocity of the structure. As noted above, entirely non-absorbing optical structures have an additional time-reversal symmetry, which says that the time-reversed ($t \rightarrow -t$) waveform of any scattering profile in the structure is also a solution of Maxwell's equations in that structure (see FIGS. 9A and 9B).

Example Conditions for Forming a Different Visual Appearances on Different Sides of a Film:

When an absorber is present in a thin film, the relationship between reflected power (R) and transmitted power (T) of R+T=1 may no longer hold. The relationship, R+T=1, will not hold when the average optical path length of propagation (including all internal reflections), L, and the maximum value of the material's attenuation coefficient, u, are such that u*L>Th, where Th is a threshold value that is less than 1. For example, in some embodiments, when Th is 0.1 for a threshold of 10% absorption, R+T=1 will not hold, or in some embodiments, when Th is 0.01 for a threshold of 1% absorption, R+T=1 will not hold. Further, although the entire multi-layer structure may be of any thickness, at least one layer should be thin, i.e., with a thickness that is commensurate with the wavelength scale of light or thinner. Under such conditions, the reflection efficiency can be different from one side of the film to the other side. This results in a visually different appearance when the object is viewed from a first side (e.g., the second side of the substrate) as opposed to a second side (e.g., the first side of the substrate).

In some embodiments, an absorbing element (or "absorber") comprises metal nanoparticles having (i.e., exhibiting) plasmon resonance. Additionally or alternatively, the absorbing element/absorber can comprise a thin film having (i.e., exhibiting) plasmon resonance. In some such embodiments, the absorbing element comprises a thin film which has been heat treated to cause it to break into nanoparticles.

Figures 10A, 10B:
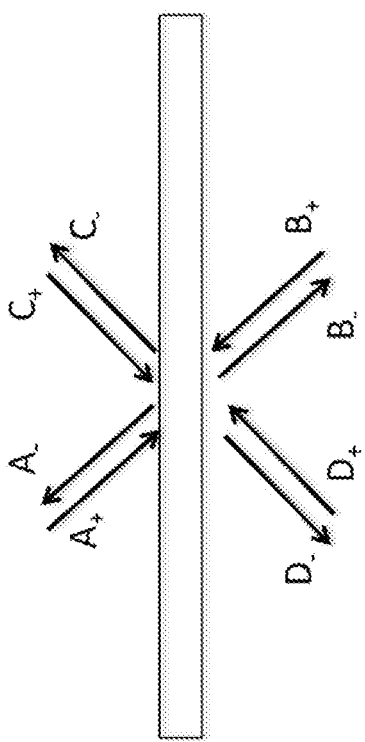
FIG. 10A shows the modes coupling to a thin film or multilayer with flat interfaces.
FIG. 10B shows the associated scattering matrix for FIG. 10A.

FIG. 10A shows the modes coupling to a thin film or multilayer with flat interfaces, and FIG. 10B shows the associated scattering matrix for FIG. 10A. The reciprocity condition ($S_{ij}=S_{ji}$) ensures that transmission is the same in both directions. With no absorption, conservation of energy provides that the reflection efficiency is the same in both directions. When there is absorption (or roughness that enables coupling to other scattering directions), then the relationship between reflected and transmitted power R+T=1 no longer holds. Since reciprocity only requires the same transmission efficiency in both directions, reflection efficiency can now differ from one side of the film to the other.

Thin film coatings are special optical structures in which all the interfaces are flat (FIG. 10), and therefore whose scattering matrix couples a very limited number of modes (a given incident plane wave only couples to transmitted and reflected plane waves). Additionally, the only transmitted wave in one direction is the same mode as the incident wave in the reversed direction (this would not be the case in a lens or rough surface, for example). As a result, when there is no absorber (time-reversal symmetry holds), all light energy is only distributed between the following modes (see FIG. 10): A (Incident $A_+$ in the forward direction, transmitted $A_-$ in the reverse direction), B (transmitted $B_-$ in the forward direction, incident $B_+$ in the reverse direction), C (reflected $C_-$ in the forward direction) and D (Reflected $D_-$ in the reverse direction). Since reciprocity gives $A_+ \rightarrow B_-$ with the same efficiency as $B_+ \rightarrow A_-$ (or power transmission, T, is the same in both directions), then conservation of energy gives $A_+ \rightarrow C_-$ with the same efficiency as $B_+ \rightarrow D_-$. In this situation no visually different appearance from two side of the multi-layered film is observed, since power conservation (R+T=1). However, if an absorber is added, A→B like B→A no longer implies A→C like B→D since light power flow is not conserved (i.e. R+T≠1). Thus, visually different appearance from two sides of the multi-layered film is obtained, and the extent of the visual difference relates to how efficiently the mode couples to the absorber relative to the reflected wave in each direction. Another way to express the effect of the absorber is to treat the light absorbed as a third output mode E (forward direction) and F (reverse direction). In this situation, the total energy appears to be conserved A→B+ C+E and B→A+D+F, where A→B just as B→A, but specific relationships between D, F and C, E are not enforced. With the last construction it becomes apparent that a structure, even if not absorbing (e.g. just roughened on one side for example) can display a visually different appearance from two side of the structure if it couples to more modes than just the reflected mode and the reverse-side incident mode (transmitted).

Difference in Appearance due to Absorptive Properties of Noble Metal Nanoparticles Multiple factors, such as position, absorption, and phase change of the metal nanoparticles in the multilayer can play a role in producing a different appearance of the film when viewed from a first side as compared with the appearance of the film when viewed from a second side.

Due to the reciprocity/energy conservation, the difference in appearance from the first side and second side is determined by the differences in net absorption from either side. The net absorption is determined by the integral of the optical path length and position dependent absorption coefficient (line integral of u(z)dL, along the paths light takes through the structure). This is the overlap between the field intensity of the mode profile in the structure and the spatially varying absorption coefficient.

The parameters that control absorption, effective optical paths and its overlap with the absorbers can include, but are not limited to, strength and location of the absorbers, and refractive indices of the layers (which affects path, reflection strengths and phase change). These effects can be predicted using the simulation tool described herein.

In some embodiments, the nanoparticle coating 120 affects the optical properties in two ways. The noble metal nanoparticles 105 absorb certain wavelengths of light and induce a phase shift in the reflected light. Both of these effects are believed to result from the complex refractive index of the material and the magnitude of these effects can be affected by the surrounding media. Therefore, the optical appearance of the composite material can differ when the nanoparticles are placed in different positions.

When deposited on a transparent substrate, the order of the position of the interfaces is inverted and the relative position of the particles within the stack differs. Such effects can interplay to create the observed thin film color which can thus differ when viewed from different sides.

Due to the complex nature of the effect, the difference in visual appearance in the multi-layered film is not intuitive and the magnitude cannot be easily anticipated. Therefore, the effect is theoretically modelled using a transfer matrix simulation. When taking into account contributions from the absorptive properties of the material (e.g., losses or a non-zero imaginary part of the refractive index) and using the real part of the complex refractive index that is close to the refractive index of the surrounding media (to take into account that the particles are embedded within the surrounding media), the color effect in all different geometries can be reproduced. This further emphasizes the fact that multiple factors, such as position, absorption, and phase change, can play a role in producing this effect.

EXAMPLES

Figures 5A, 5B, 5C, 5D, 5E, 5F:
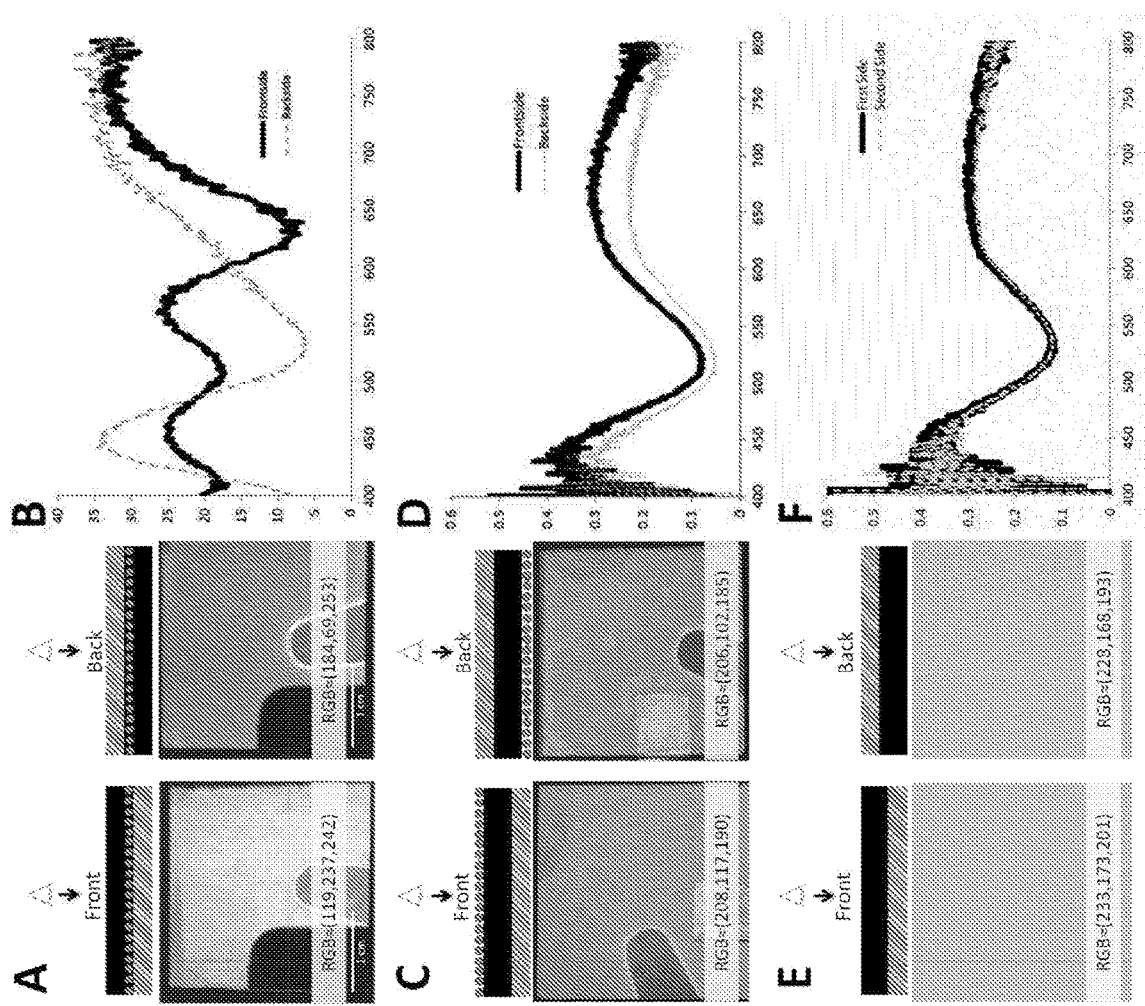
FIG. 5A shows the optical images (bottom) and geometry (top) of titania (~218 nm, dark color) thin film on a glass substrate (striped) coated with gold nanoparticles (dots). The scale bar is 1 cm in the optical images.
FIG. 5B shows the reflectance spectra for the sample in FIG. 5A taken from both sides of the substrate (solid line, top surface; dashed line, bottom surface)
FIGS. 5C and 5D are the same as FIGS. 5A and 5B for a thin film with nanoparticles on top of the layers instead of embedded in the thin film on the glass substrate.
FIGS. 5E and 5F are the same as FIGS. 5A and 5B for a thin film without nanoparticles on top of the layers instead of embedded in the thin film on the glass substrate.

FIG. 5A shows the optical images (bottom) of titania thin film on a glass substrate with gold nanoparticles. The cross-sectional schematic is shown on top, along with the angle of observation. A glass substrate is illustrated as the striped pattern, the gold nanoparticles are illustrated as circles, and the titania is indicated as a black film. The scale bar is 1 cm in these images. The sample when viewed from the first (front) side is a bright blue color (RGB: 119, 237, 242) and when viewed from the second (back) side is a purple color (RGB:184, 69, 253). FIG. 5B shows the reflectance spectra for the sample in FIG. 5A taken from both sides of the substrate (solid line, top/front surface; dashed line, bottom/back surface). FIGS. 5C and 5D depict similar information as FIGS. 5A and 5B, but for a thin film with nanoparticles on top of the layers instead of embedded in the thin film on the glass substrate. The sample of FIG. 5C, when viewed from both sides, is a pinkish purple color (first side RGB: 208,117,190 and second side RGB: 206,102, 185). FIGS. 5E and 5F depict similar information as FIGS. 5A and 5B, but for a thin film without any nanoparticles either embedded in the film or attached to its top surface.

The sample of FIG. 5E, when viewed from both sides, is a pinkish purple color (first side RGB: 233,173,201 and second side RGB: 228,168,193). As can be clearly seen from FIGS. 5A-5F, a thin film interference pigment with nanoparticles embedded within the film (i.e. the gold nanoparticles siting at the interface between substrate and thin film) shows a different color when viewed in reflection from the first side and the second side. In the example illustrated here, the color appears cyan (RGB values extracted from the color are approximately: 119,237,242) when viewed from the first side, and magenta when viewed from the second side (RGB: 184,69,253). The corresponding reflection spectra, shown in FIG. 5B, underline the strong difference in optical appearance.

However, when the particles are deposited on top of the thin film (i.e. at the interface between air and thin film coating), the visual appearances from the first side and the second side do not differ strongly. This phenomenon underlines the strong dependence of coloration on the position of the particles within the film. A simulation tool using a 1D transfer matrix method was used to model each layer with its thickness and refractive index, the refractive index of the substrate, and taking the nanoparticles to be a thin film (usually 20 nm) with the imaginary portion of the refractive index modeled as a Gaussian and the real part taken to be the material the particles are embedded in or using values from literature, such as, S. Kubo, A. Diaz, Y. Tang, T. S. Mayer, I. C. Khoo, and T. E. Mallouk, "Tunability of the refractive index of gold nanoparticle dispersions," Nano Lett. 7(11), 3418-3423 (2007), to calculate the refractive index due to a certain volume fraction of gold nanoparticles in the material. Numerical simulations using the above 1D transfer matrix system, and taking into account the complex nature of the refractive index of the noble metal particles, confirm the effect theoretically, as seen in FIG. 6.

Figures 6A, 6B, 6C, 6D:
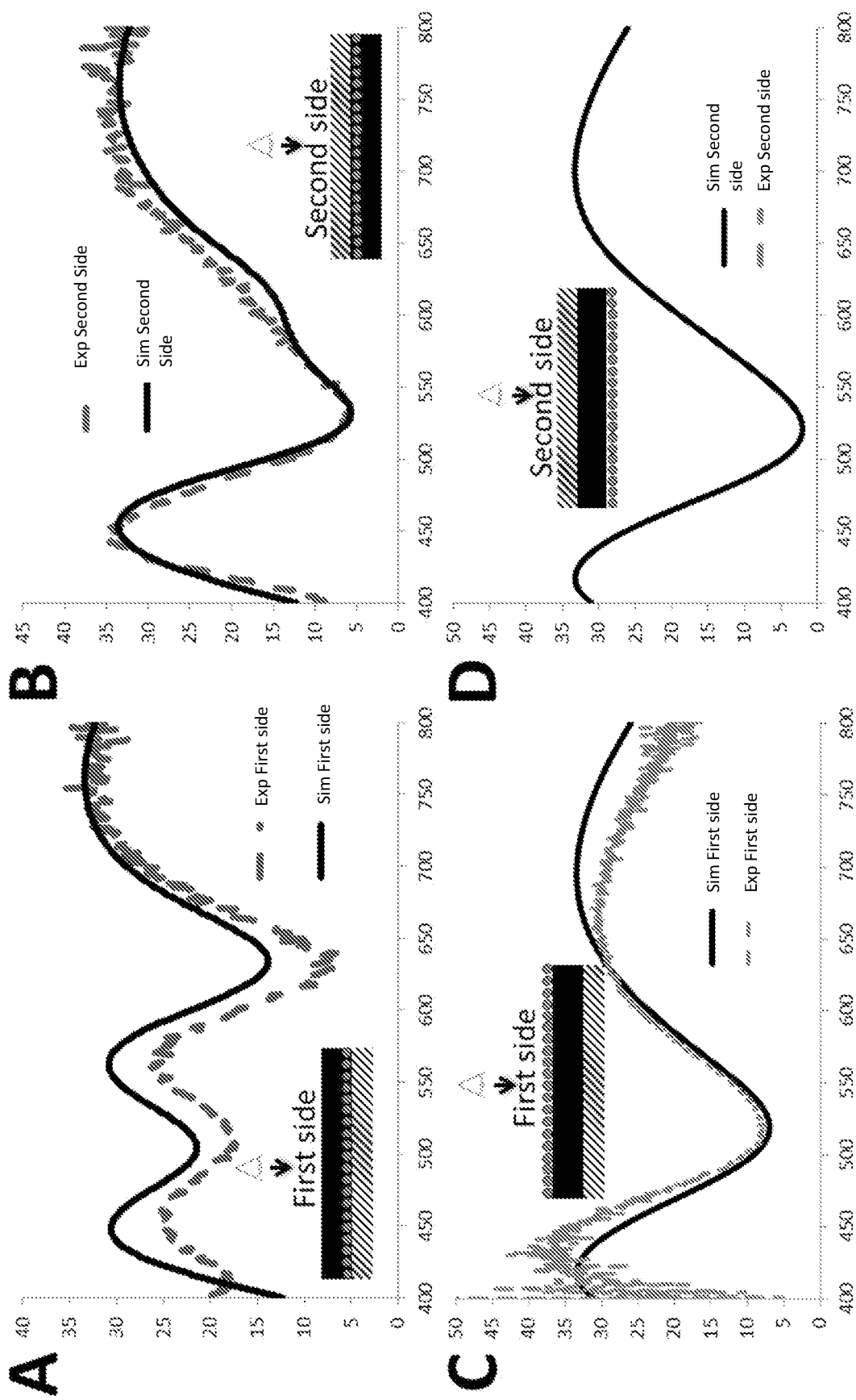
FIGS. 6A-6D illustrates the reflectance spectra obtained from measurements and theoretical models for the first and second side of the two samples shown in FIGS. 5A-5D.

FIG. 6 illustrates the reflectance spectra for the first side and the second side of the two samples shown in FIGS. 5A-D, along with the simulated reflectance spectra for the same geometries. A good agreement between the experimental and theoretically predicted spectra proves that the model captures the dominant optical effects of the material, as discussed below. In particular, FIGS. 15A-15B show the comparison of the simulation to measurements for a multi-layered film of titania on gold nanoparticle coated glass. FIG. 6A shows the comparison of the reflectance spectrum from FIG. 5B (first side) and simulated reflectance for the first side of a multi-layered film as shown in FIG. 5A. FIG. 6B shows the comparison of the reflectance spectrum from FIG. 5B (second side) and simulated reflectance for the second side of a multi-layered film shown in FIG. 5A. FIGS. 6C and 6D show data that is similar to that of FIGS. 6A and 6B (respectively), but that correspond to a thin film of titania with nanoparticles on top of the film, corresponding to structure shown in FIG. 5C.

The effect described above can also be observed in multilayer coatings. In fact, in a multi-layered film, several interfaces are available where a metal nanoparticle (such as a noble metal nanoparticle) may be deposited. In an aspect of this invention, this has been identified as a parameter that can be effectively used for engineering the visual appearance and optical properties of a film from both sides of the film.

The effect of the addition of gold nanoparticles to different interfaces within a multilayer thin film is shown in FIGS. 7A-7E, where samples that differ in the position of the nanoparticles within the multilayer architecture were prepared. Blank samples 1, 2, 3 and 4 were prepared without any incorporated nanoparticles (i.e., "blanks"). Additionally, samples were prepared with a nanoparticle coating disposed at an interface within the multi-layered film structure. Gold sample 1, corresponding to blank sample 1, had a nanoparticle coating under the first layer (i.e., at the interface between substrate and multilayer structure). Gold sample 2, corresponding to blank sample 2, had a nanoparticle coating under the second layer (i.e., in between layers 1 and 2). Gold sample 3, corresponding to blank sample 3, had a nanoparticle coating under the third layer (i.e., in between layers 2 and 3), and gold sample 4, corresponding to blank sample 4, had a nanoparticle coating under the fourth layer (i.e., in between layers 3 and 4).

Figures 7A, 7B, 7C, 7D, 7E:
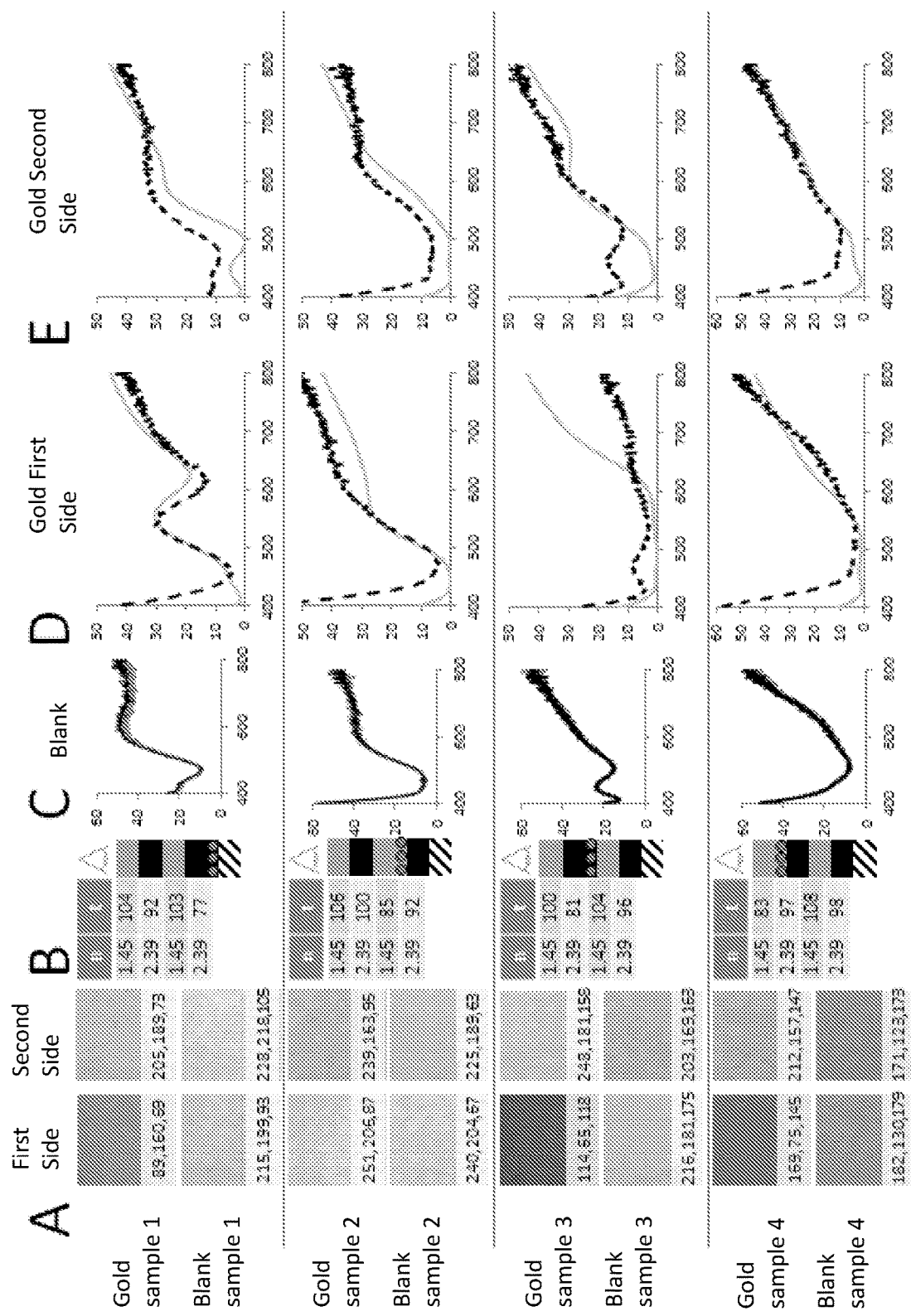
FIG. 7A-7E shows the effect of addition of gold nanoparticles to different interfaces within a multilayer thin film.

FIG. 7A shows the optical images of both sides of multilayer films with gold nanoparticles incorporated at different positions in the multilayer (gold samples 1, 2, 3, and 4) and the same stacks without the addition of the nanoparticles (blank samples 1, 2, 3, and 4). The resulting color was characterized by RGB values and is noted below the images.

FIG. 7B shows the thickness (in nanometers) and refractive indices of the sputtered layers of titania (n~2.4) and silica (n~1.5) measured using ellipsometry and a schematic showing the geometry of the layers of silica (grey), titania (black), gold nanoparticles (dots), and the glass substrate (striped texture) of the gold samples 1, 2, 3 and 4.

FIG. 7C shows the reflectance spectra measured from both sides of the "Blank" samples (black, first side gray, second side).

FIG. 7D shows the reflectance spectra measured (thick dashed line) and simulated (thin solid line) from the first side of the "Gold," samples.

FIG. 7E shows the reflectance spectra measured (thick dashed line) and simulated (thin solid line) from the second side of the samples.

It can be seen that for all samples in FIGS. 7A-7E, the blanks show no difference in observable color when viewed from a first side and a second side-showing yellow colors for samples 1 and 2, pale pink for sample 3, and pale purple for sample 4. This conclusion is further validated by the spectra in FIG. 7C, showing (in each part) the two spectra taken from the first side and the second side, respectively. The spectra line up perfectly with one another, with deviations only coming from noise in the data.

In contrast, the colors observed from the first side and the second side of the films that include gold nanoparticles (labeled "Gold" in the figure) are always different from one another, with varying levels of observable difference.

Gold sample 1 is green (RGB: 89,160,69) from the first side and yellow (RGB: 205,189,73) from the second side.

Gold sample 2 is yellow (RGB: 251,206,87) from the first side and orange-yellow (RGB: 239,163,95) from the second side.

Gold sample 3 is purple (RGB: 114,65,118) from the first side and pale pink (RGB: 248,181,158) from the second side.

Gold sample 4 is magenta (RGB: 169,75,145) from the first side and pale pink (RGB: 212,157,147) from the second side.

FIG. 7D shows the spectra observed from the first side of each sample compared to the simulated reflectance spectra. FIG. 7B schematically illustrates the "first-side" viewing direction and the location of the gold nanoparticles for each of the samples. A good agreement between the measured spectra and simulated spectra is observed for all samples.

Similarly, FIG. 7E shows the reflectance spectra observed from the second side of the samples along with the simulated spectra for comparison. The simulations, using the simulation tool described earlier in this document, agree well with the experimental results, implying that these can be used as a predictive tool to design the color of the film observable from both sides of the substrate.

In some embodiments, the color of the film can be further controlled by addition of one or more additional dielectric layers. For example, comparing the film shown in FIG. 5A (having one dielectric layer deposited on the substrate) and the film shown FIG. 7A, Gold sample 1 (having additional dielectric layers forming a multilayered structure) shows that the appearance of the sample changes from a blue appearance (RGB: 119, 237, 242—see FIG. 5A, left side) when viewed from the first side, to a green appearance (RGB: 89, 160, 69—see FIG. 7A, Gold sample 1, First Side) due to the presence of additional dielectric thin film layers. Similarly, the appearance of the film in FIG. 5A from the second side is a magenta (RGB: 184,69,253—see FIG. 5A, right side), whereas upon the addition of a plurality of the dielectric thin film layers, the appearance changes to green (RGB: 205,189,73—see FIG. 7A, Gold sample 1, Second Side) as seen in FIG. 7A. This clearly demonstrates the effect of the presence of addition of number of dielectric layers on the appearance of the film from both the first and second side.

Additionally, in some embodiments, the appearance of the multi-layered film from a first side and a second side (e.g., a front side and a back side, respectively) may be controlled by adjusting the thickness of one or more of the individual layers that form the plurality of thin film layers 110. This is evident upon comparing the appearance of the Blank samples 1, 2, 3, and 4 from the first side and the second side shown in FIG. 7A. As described above and shown in FIG. 7B, all the Blank samples 1, 2, 3, and 4 have the same architecture consisting of no metal nanoparticles at the interface and having 4 layers of dielectric material stacked in the same order over a substrate. However, the thicknesses of the individual layers are different. This variation in the thickness results in the change in the visual appearance of the sample from both first and second side. The RGB values of Blank Sample 1, 2, 3, and 4 from the first side are (RGB: 215,199,93); (RGB: 240,204,67); (RGB: 216,181,175); and (RGB: 182,130,179), respectively. The RGB values of the Blank Samples 1, 2, 3, and 4 from the second side are (RGB: 228,218,105); (RGB: 225,189,63); (RGB: 203,169,163); and (RGB: 171,123,173), respectively.

In some embodiments, the appearance of the multi-layered film from the first side and the second side may be controlled by adjusting the number and thickness of the individual layers. In some embodiments, the appearance of the multi-layered film from the first side and the second side may be controlled by adjusting the number and/or thickness of the individual layers along with location of the interface in which the metal nanoparticles are deposited.

In certain embodiments, a pattern of nanoparticles can be deposited that results in different optical properties in a thin film or multilayer. The pattern also has a different appearance from both sides, and can even have the effect of only being visible from one side.

Figures 8A, 8B, 8C:
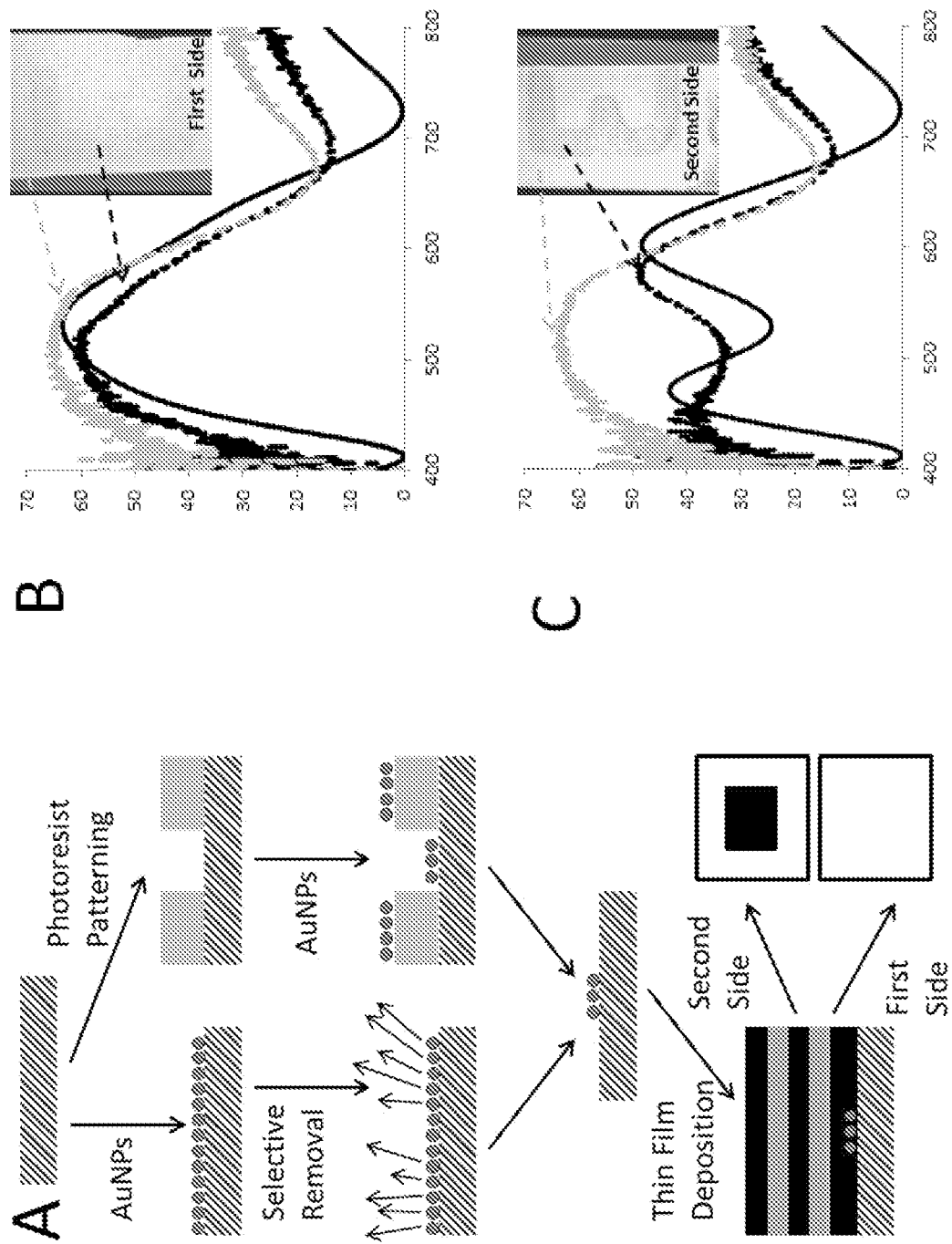
FIG. 8A shows that pattern can be prepared by selective deposition or removal of nanoparticles, leading to nanoparticles being present only at specified parts of the interface.
FIGS. 8B and 8C illustrate that the visibility of the pattern "E" formed by selective presence of particles at the interface results in very different appearances viewed from different sides.

In certain embodiments, the pattern can be prepared by selective deposition or removal of nanoparticles, leading to nanoparticles being present only at specified parts of the interface, as shown in FIG. 8A. In certain embodiments, photoresist patterning can be used for attaining multi-layered structures with nanoparticles present at specific parts of an interface. Other methods of patterning, such as, stenciling, contact printing, inkjet printing, painting, spray coating through mask, selective mechanical removal may be used for selective deposition of the nanoparticles at specific parts of the interface. The structure that results has optical properties that are different from both sides.

FIG. 8B shows the spectra from the first side of the substrate. The dashed lines show experimentally measured spectra from an area within the pattern containing nanoparticles (black, dashed) and an area outside of the pattern (gray, dashed) along with the simulated reflectance spectrum for the first side of the sample containing nanoparticles (black, solid). As in the previous figures, there is a good agreement between the simulated spectrum and the experimental spectrum. Also, it can be seen in the inset that the "E" pattern is difficult to observe from the first side. The similarity of the reflectance spectra confirms this. Conversely, in FIG. 8C, the experimental reflectance spectra from inside and outside of the patterned "E" along with the simulated spectrum for the second side reflection from the inside of the pattern is shown. The difference between the two experimental reflectance spectra is easily observable, as can also be seen in the inset where the "E" is clearly visible as a pink color against the turquoise background. FIGS. 8B and 8C clearly illustrate that the visibility of the pattern is very different when viewed from different sides.

Figure 8D:
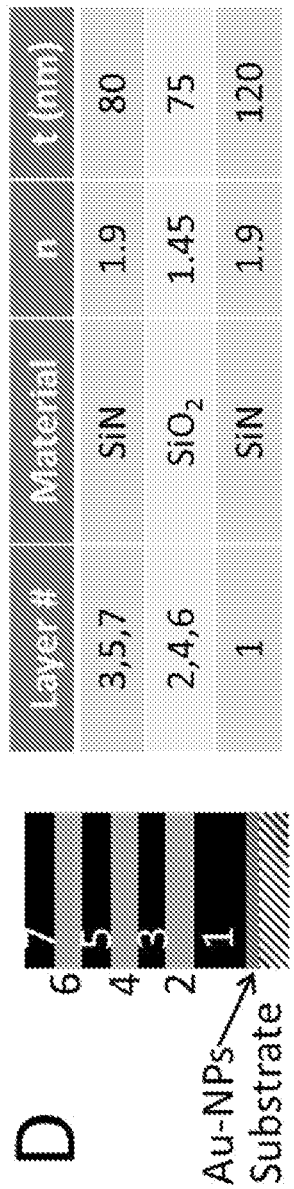
FIG. 8D shows a schematic of a 7 dielectric layers multilayer film, with gold nanoparticle layer at the interface between the dielectric layers and the substrate (right). The Table shows the refractive indices and thickness for each of the dielectric layers of the multilayer film.

FIG. 8D shows a schematic of a 7-dielectric-layer multilayer film, with a gold nanoparticle layer at an interface between the dielectric layers and the substrate (right). The Table of FIG. 8D shows the refractive indices ("n") and thicknesses ("t") for each of the numbered dielectric layers of the multilayer film.

FIGS. 11A through 11I shows two alternate patterning methods for gold nanoparticles created from gold thin films. Method 1 includes patterning gold nanoparticles only in regions without photoresist. This is shown in FIGS. 11A through 11C and FIGS. 11D through 11F. Method 2 includes patterning gold nanoparticles everywhere except for the edges of the photoresist. This is shown in FIG. 11A through 11C and FIGS. 11G through 11I.

Figures 11A, 11B, 11C, 11D, 11E, 11F, 11G, 11H, 11I:
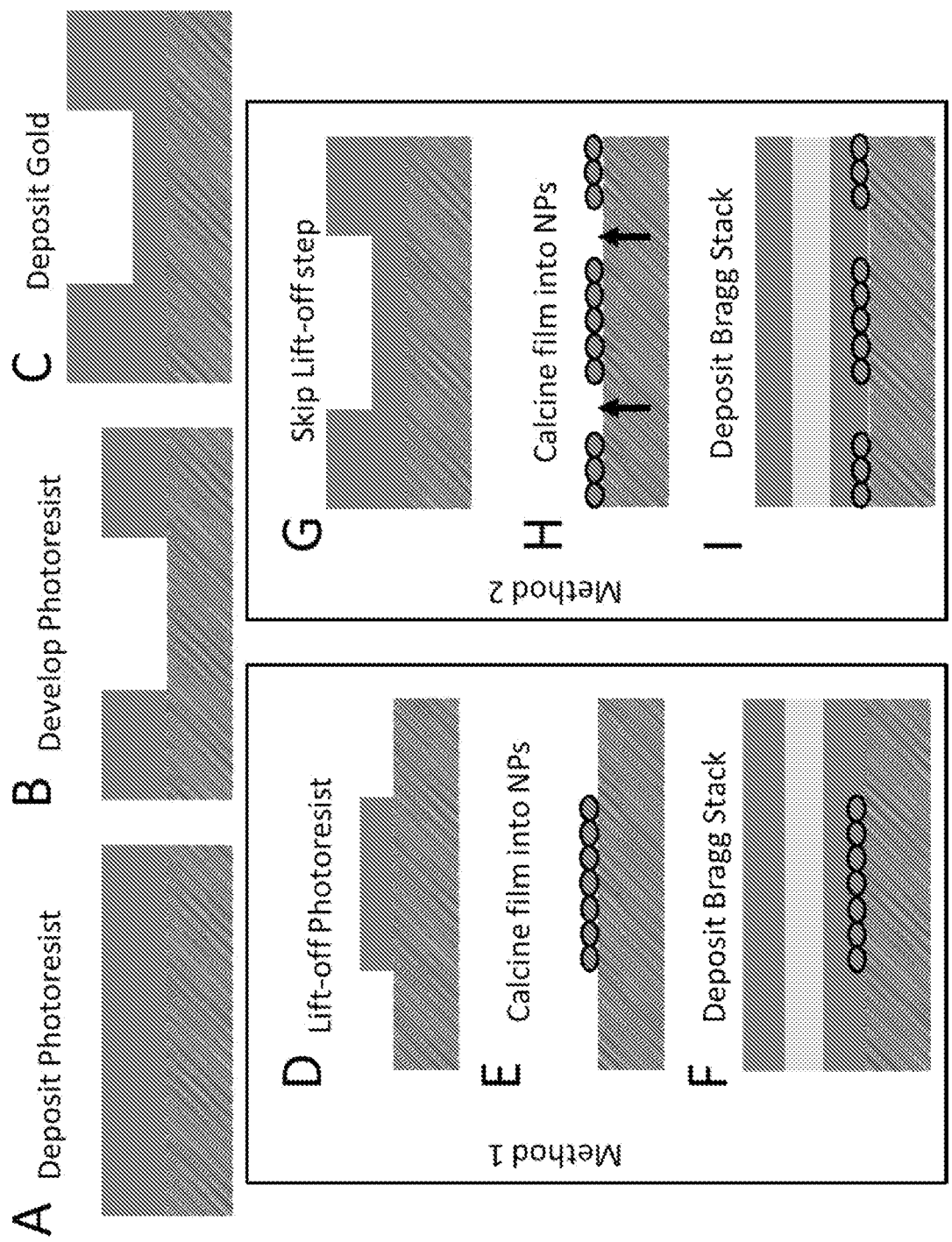
FIGS. 11A through 11I show two alternate patterning methods, method 1 and method 2 for gold nanoparticles created from gold thin films.

FIG. 11A shows a schematic where photoresist has been deposited on the substrate using spin coating. FIG. 11B shows the schematic where the photoresist of FIG. 11A has been developed through exposure through a photomask. FIG. 11C shows a schematic for depositing a thin film of gold on the sample shown in FIG. 11B. In some embodiments an e-beam evaporation or similar method may be used for this step. In accordance with some embodiments, as shown in FIG. 11D lift-off is performed on the photoresist to remove the gold film with the photoresist leaving the substrate patterned with a gold layer. FIG. 11E shows a schematic of the sample of FIG. 11D after calcination that converts the gold film into nanoparticles. FIG. 11F shows a schematic after deposition of a plurality of thin film layers on the sample shown in FIG. 11E.

Similarly, the method 2, which continues with using sample shown in FIG. 11C, schematically shows in FIG. 11G that the lift-off step is skipped, leaving the gold and photoresist on the sample. FIG. 11H shows a schematic of the sample from FIG. 11G after it has been calcined to burn away the photoresist and convert the gold film into nanoparticles that are on the surface already, or attach to the surface after the photoresist has burned away. In doing so, regions are created, corresponding to the location of the edge of the photoresist, where there are no nanoparticles on the surface. These are indicated by the arrows in the FIG. 11H. Subsequently, FIG. 11I shows the schematic after deposition of a plurality of thin film layers on the sample shown in FIG. 11H.

Figures 12A, 12B, 12C, 12D, 12E, 12F:
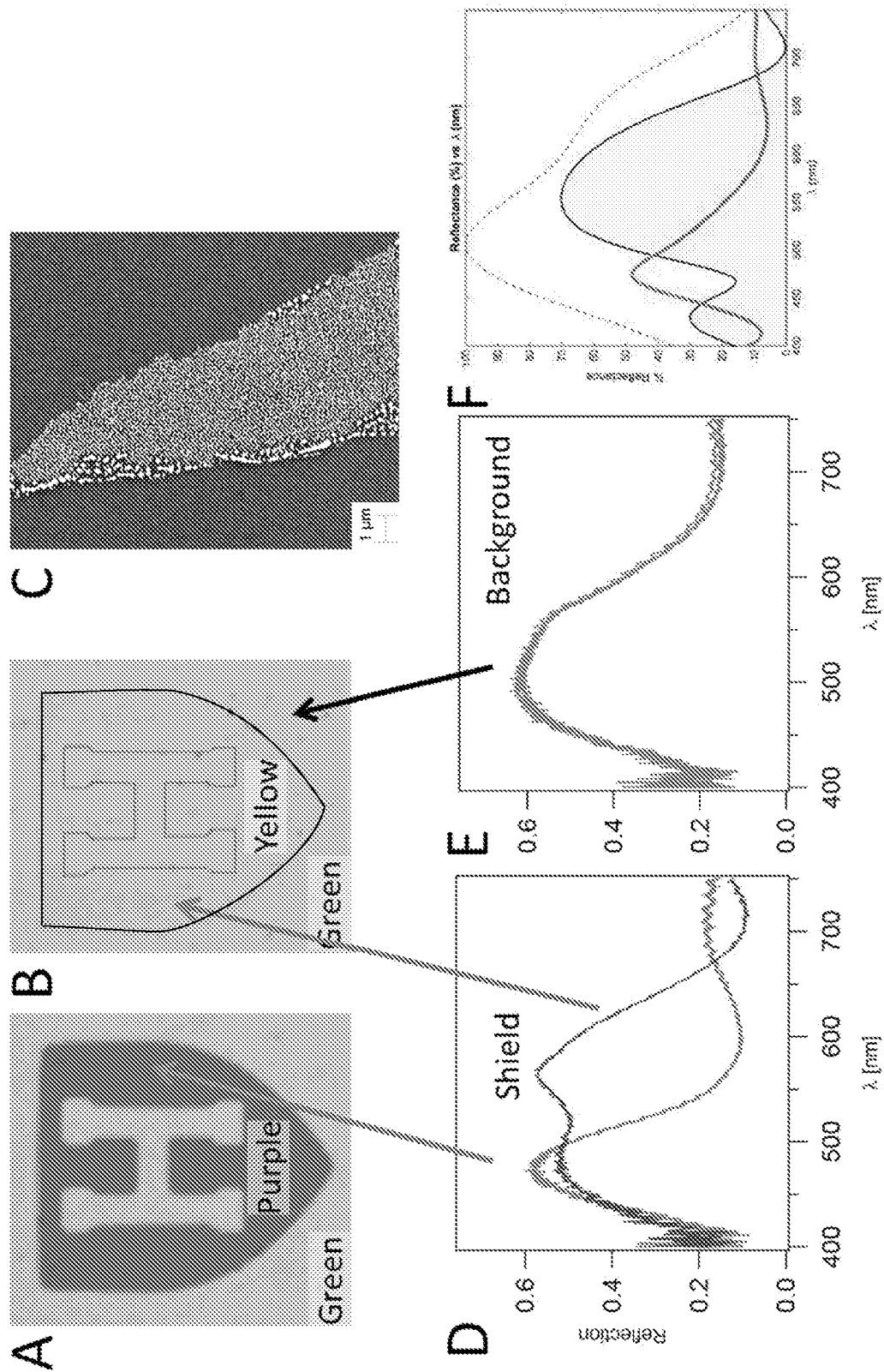
FIG. 12A shows the optical micrograph of the bottom surface of multi-layered film created using method 1.
FIG. 12B is the same as FIG. 12A for the top surface.
FIG. 12C shows the SEM image of the nanoparticles formed from annealing the thin film of gold.
FIG. 12D is a plot of the reflectance spectra of the shield region (containing nanoparticles) of FIGS. 12A and 12B), as indicated by arrows.
FIG. 12E shows the reflectance spectra of the background region (containing no nanoparticles)
FIG. 12F shows simulated reflectance spectra for both sides of the sample.

FIG. 12 shows the multi-layered film containing metal nanoparticles made by patterning films using method 1. FIG. 12A shows the optical micrograph of the bottom surface of multi-layered film created using method 1. FIG. 12B is the same as FIG. 12A for the top surface. FIG. 12C shows the SEM image of the nanoparticles formed from annealing the thin film of gold. FIG. 12D shows the reflectance spectra of the shield region (containing nanoparticles), as shown in FIGS. 12A and 12B, viewed from the bottom (left curve) and top (right curve), respectively. FIG. 12E shows the reflectance spectra of the background region (containing no nanoparticles). FIG. 12F shows simulated reflectance spectra for both sides of the sample.

Figures 13A, 13B, 13C, 13D:
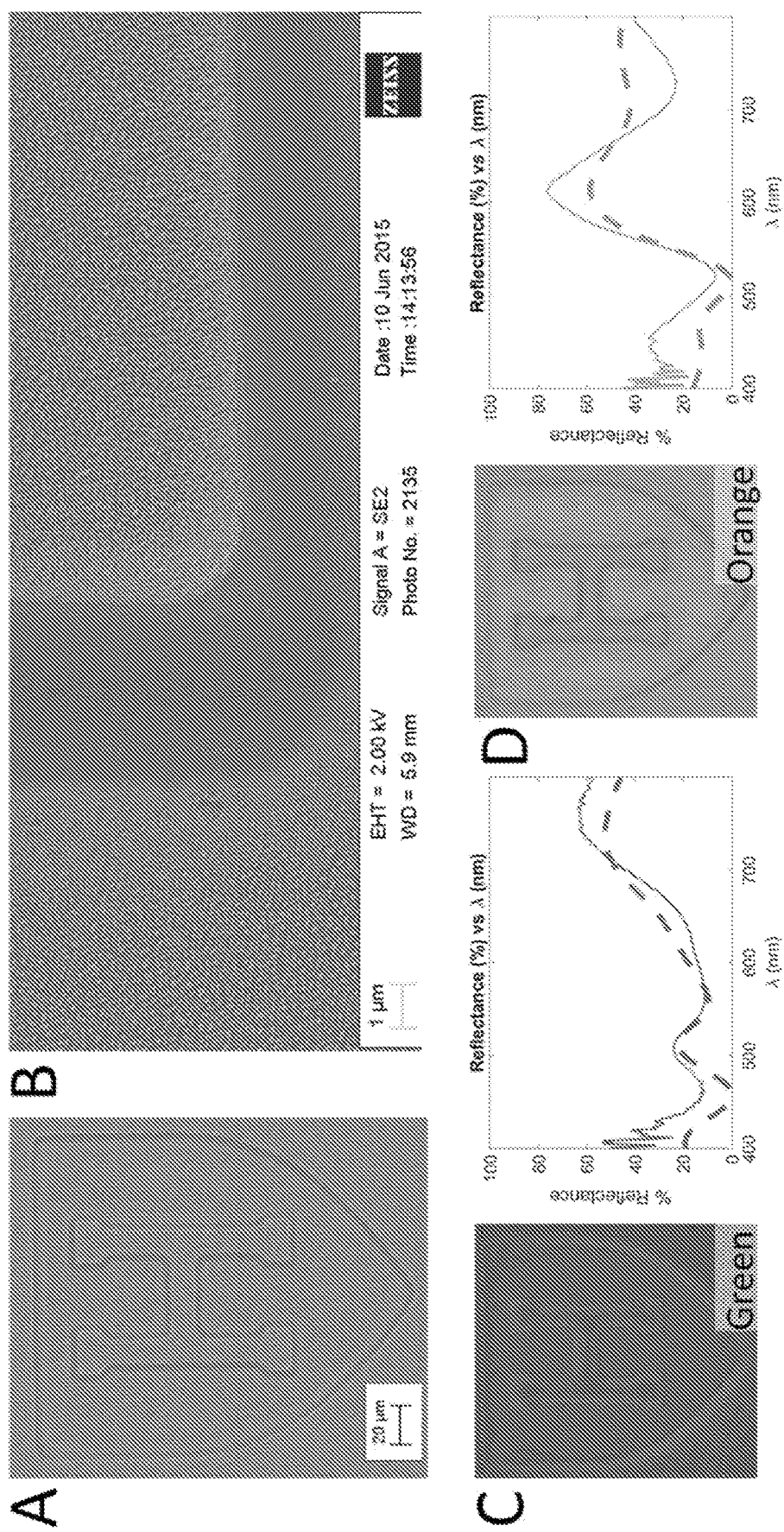
FIG. 13A shows an SEM image of a single Harvard shield showing the locations of the nanoparticles everywhere except the edges of the photolithographic pattern.
FIG. 13B shows a higher magnification SEM image of the sample shown in FIG. 13A.
FIG. 13C, on the right, shows an optical micrograph of the top surface of a Silicon Nitride/Silicon Dioxide 5-layer multi-layered film created using the sample in FIG. 13A; on the left, shows measured (solid line) and simulated (dashed line) reflectance spectrum for the sample measured from the top side.
FIG. 13D shows the same information shown in FIG. 13C for the sample in FIG. 13A, imaged/measured from the bottom side.

FIG. 13 shows the multi-layered film containing metal nanoparticles made by patterning films using method 2. FIG. 13A shows an SEM image of a single Harvard shield showing the locations of the nanoparticles everywhere except the edges of the photolithographic pattern. FIG. 13B shows a higher magnification SEM image of the sample shown in FIG. 13A, with nanoparticles more clearly visible from the lower left portion of the "H". FIG. 13C, on the right, shows an optical micrograph of the top surface of a Silicon Nitride/Silicon Dioxide 5-layer multi-layered film created using the sample in FIG. 13A; on the left, shows measured (solid line) and simulated (dashed line) reflectance spectrum for the sample measured from the top side. FIG. 13D shows the same information shown in FIG. 13C for the sample in FIG. 13A, imaged/measured from the bottom side.

Examples of Janus Thin Films

Figure 14F:
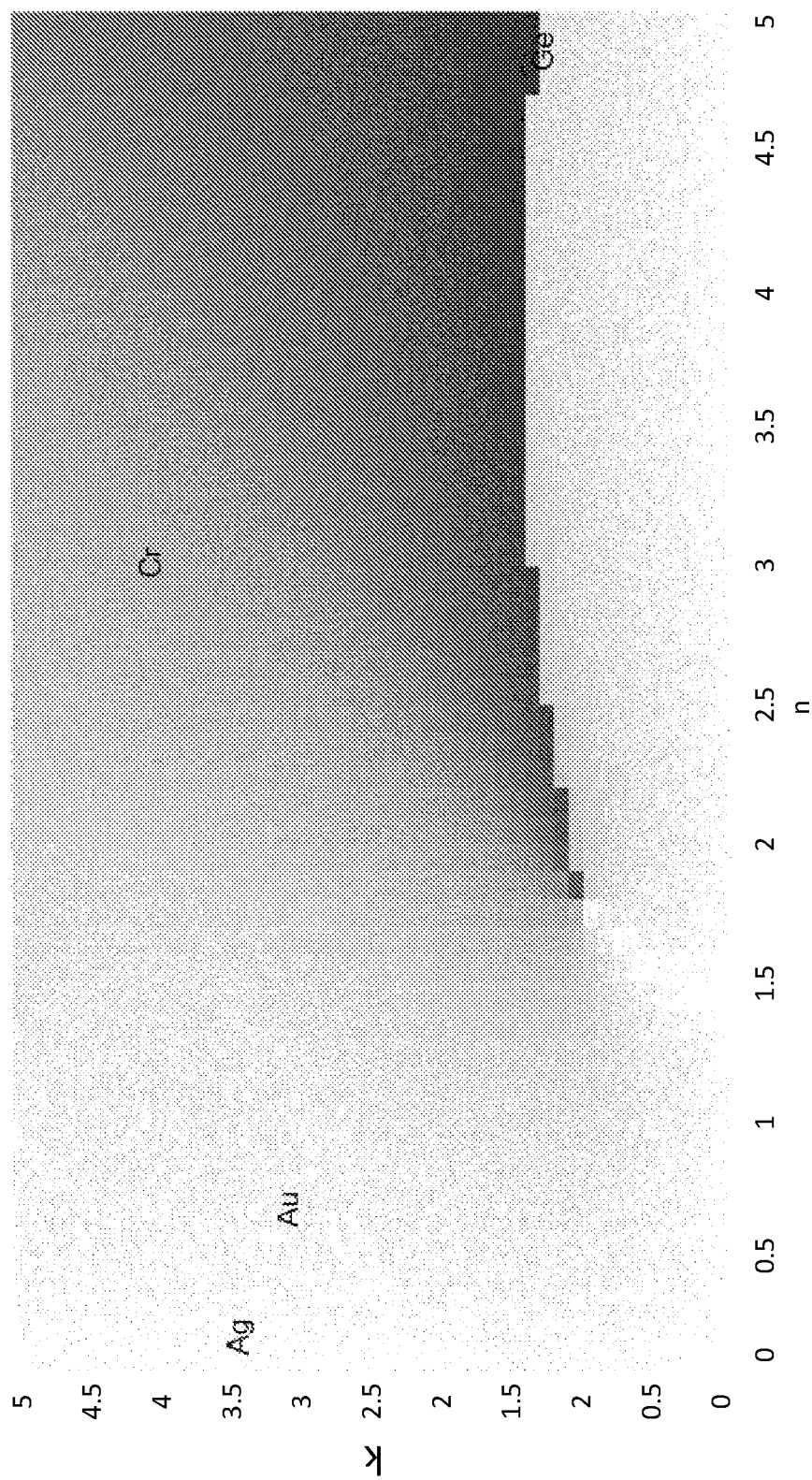
FIG. 14F shows the results of an array of transfer matrix simulations for a 200 nm thin film of Titania (RI=2.45) with a 7 nm absorbing layer at the bottom on a glass substrate for various real and imaginary parts of the RI of the absorbing layer, according to some embodiments.

We fabricate optical Janus thin films using gold nanoparticles (d~12 nm) as an absorbing element in combination with a titania thin film used as the photonic element causing thin film interference. We adsorb gold nanoparticles electrostatically via a silane linker onto a transparent glass slide onto which we deposit a titania thin film (d=228 nm) via sputter coating (supplementary information). The small size of the nanoparticles and the non-directional deposition via sputter coating enables us to embed the nanoparticles without compromising the properties of the titania thin film used as the photonic element. In FIGS. 14A-14G, we compare the viewing direction-dependent optical properties of the thin film to a reference sample without any absorbing gold nanoparticles and a sample with gold nanoparticles deposited at the air/titania interface. As expected, the color observed from either side of the thin film without an absorbing material is identical (FIG. 14A), whereas that observed on the sample with the absorbing layer between the substrate and the dielectric shows a strong difference in the color observed from either side (FIG. 14B). The sample appears a bright cyan color when viewed from the film side and a violet color when viewed from the substrate side. The drastic difference between the color observed in these two configurations is further emphasized by the measured reflectance spectra for the two reflectance measurements (dashed lines, FIG. 14B).

If the gold nanoparticles are deposited at the air/titania interface, the main difference observed in the color of each side is in the reflected intensity of the spectrum, but not the location of the peak and trough wavelengths (FIG. 14C). As we outline in detail below, the complex refractive index (RI) of the absorbing layer is the main origin of the optical Janus effect, which can therefore be observed for different absorbing materials. When noble metal nanoparticles are used, this complex RI is very sensitive to their dielectric environment. Thus, the optical properties can be controlled via the position of the absorbing layer within the composite photonic structure. The three fundamental configurations shown in FIGS. 14A-14C demonstrate the key parameters in designing coatings with asymmetric structural coloration: the presence of an absorbing element, its position relative to the other optical elements, and its complex refractive index.

Figure 14G:
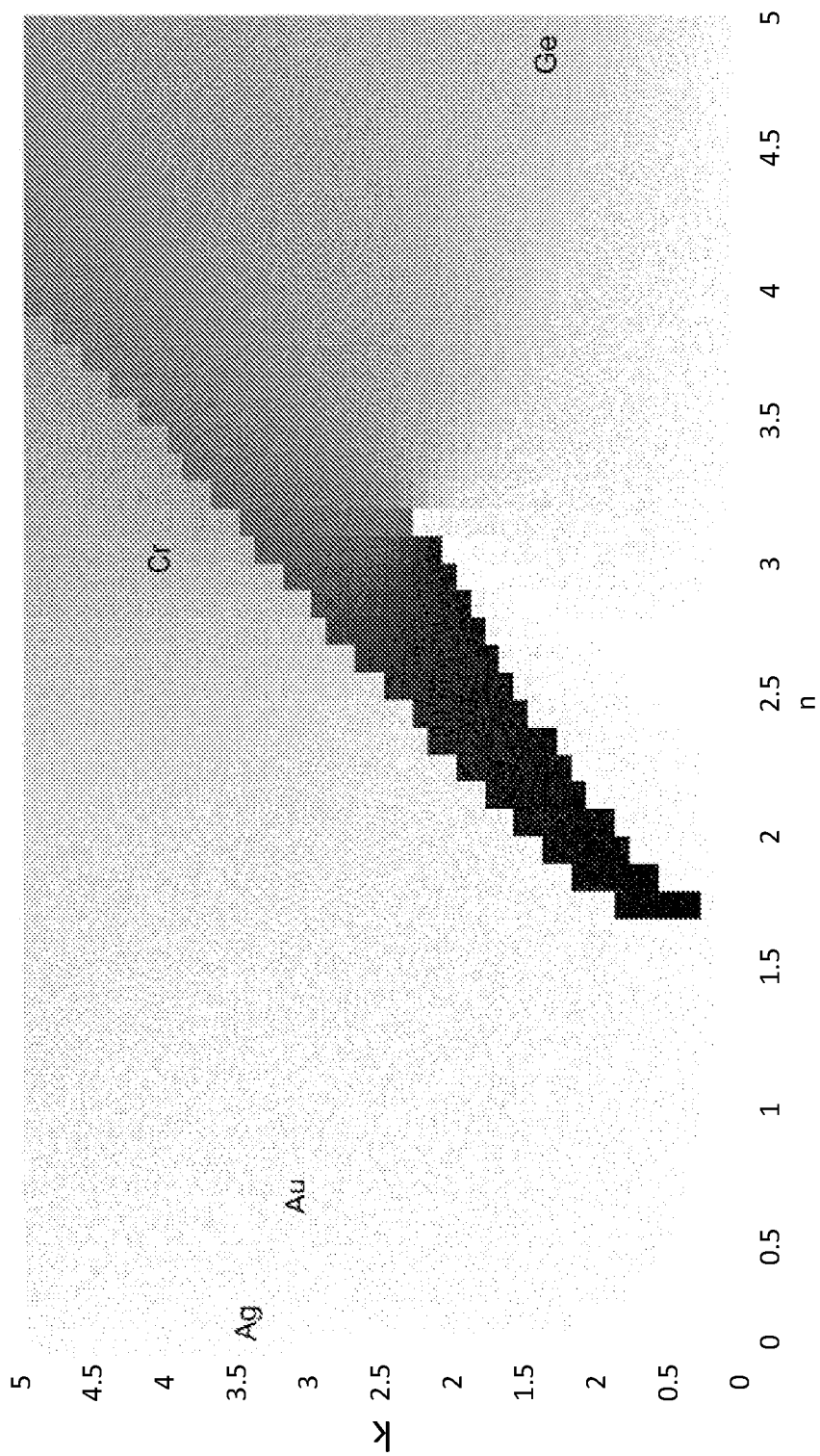
FIG. 14G shows the results of an array of transfer matrix simulations for a 200 nm thin film of silicon nitride (RI=1.95) with a 7 nm absorbing layer at the bottom on a glass substrate for various real and imaginary parts of the RI of the absorbing layer, according to some embodiments.

As noted above, FIGS. 14A-14G illustrate the optical Janus effect observed in thin film architecture. Specifically, FIG. 14A (film side) shows a photographic image (left) of a titania (~218 nm) thin film on a glass substrate, with simulated (dashed) and measured (solid) reflectance spectra (right), measured from the film side of the sample. The illustration between the two images shows the sample configuration and observation direction. (substrate side) Same as above, but for the sample measured from the substrate side of the sample. FIG. 14BA is similar to FIG. 14A, but illustrates a thin film containing gold nanoparticles located at the substrate/thin film interface (shown as red circles in the illustration). FIG. 14C is similar to FIG. 14B, but with the nanoparticles located at the air/thin film interface. All scale bars are 1 cm. FIGS. 14D-14G illustrate the structural origin of the optical Janus effect. FIGS. 14D and 14E are schematics showing the anomalous phase shift upon reflection from a thin absorbing layer (center layer in FIG. 14E) in a thin film material (upper, darker layer in FIGS. 14D and 14E) on a transparent substrate (hatched). The refractive index (RI) of the thin film material is assumed to be higher than that of the substrate. FIG. 14D illustrates the phase changes of 0 and $2\pi$ upon external and internal reflections of a dielectric layer. FIG. 14D is similar to FIG. 14D, but shows a dielectric film deposited on an absorbing layer showing anomalous reflection phase changes from the absorbing interfaces. FIG. 14F shows the results of an array of transfer matrix simulations for a 200 nm thin film of Titania (RI=2.45) with a 7 nm absorbing layer at the bottom on a glass substrate for various real and imaginary parts of the RI of the absorbing layer, where the greyscale in the image refers to the difference in the hue coordinate of the simulated HSV values for the first and second sides of the simulated sample (wherein the darker colors represent stronger differences in hue). FIG. 14G is similar to FIG. 14F, but for a thin film of SiN (RI=1.95).

Theory

Without wishing to be bound by any particular theory, we attribute the observed asymmetric reflection properties to the anomalous phase shifts occurring upon the reflection from an absorbing layer as predicted by the Fresnel reflection coefficient for normal incidence shown below.

$$r_{1,2} = \frac{\tilde{n}_1 - \tilde{n}_2}{\tilde{n}_1 + \tilde{n}_2}$$

Where $\tilde{n}_1$, $\tilde{n}_2$ are the complex RIs of the incident and reflecting media, respectively, with the imaginary part of the RI representing the loss or gain of the material. For non-normal incidence, these coefficients are different for the transverse electric and transverse magnetic polarizations; for simplicity, we assume normal incidence for all calculations. It can easily be seen that when there is no absorption, the Fresnel coefficient will be purely real, and therefore will cause either a 0 or $\pi$ phase change in the reflected light (FIG. 14D). However, when one or both of the media have complex RIs, the Fresnel reflection coefficient becomes complex, and therefore imparts an anomalous phase shift (deviating from 0 or $\pi$) on the reflected light, as shown in FIG. 14E.

In a conventional thin film (FIG. 1D) without any absorbing elements, a $\pi$ phase shift (half a wavelength) occurs at the first interface regardless of which direction is being illuminated; provided that the RI of the thin film is higher than that of the substrate. Within the film, there will be no phase shift for the internal reflections. Thus, while the light can reflect off the internal surface any number of times, the total phase accumulated for a given path is the same regardless of the incident direction: the reflected structural color observed from either side of the material is identical.

In the presence of absorbing elements, the phase shift will not follow the simple trend as described before. Depending on its complex refractive index and the RIs of the surrounding materials, a phase change in between 0 and $\pi$ will be observed upon reflection from the absorbing layer (FIG. 14E). Since the RIs of the materials on either side of the absorbing layer are different, the accumulated phase is no longer the same for light incident from either side of the structure and we can expect to see the optical Janus effect (see Supplementary Information for a derivation of the analytical calculations of the effect). From these simple arguments, we calculate the strength of the optical Janus effect based on the anomalous phase changes upon reflection from thin film ($\alpha$) and substrate side ($\beta$). We use the transfer matrix method and vary the real and imaginary part of the RI of the absorbing layer, which we model as a thin absorbing layer placed underneath the photonic thin film structure. FIGS. 14F-14G show exemplified analytical solutions for thin-film structures made of titania (FIG. 14F) and silicon nitride (FIG. 14G) each of which has a thin absorbing layer (7 nm) at the substrate/thin-film interface with varying complex RIs. The triangle pointing up is colored with the simulated human-eye perceived color as observed from the film side of the sample, while the triangle pointing down is the same for the sample observed from the substrate side. The strongest structural color asymmetry, i.e., the biggest color change for different viewing directions, can be observed for high real and imaginary parts of the RI of the absorbing element.

These analytical calculations explain the dependence of the observed optical Janus effect on the position of the absorbing element shown in FIGS. 14A-14C. If the absorbing gold nanoparticle layer is positioned at the air/thin-film interface, the surrounding material occupying most of the physical volume of the layer is air, so the real part of the effective RI of the absorbing layer is low. Moreover, the localized surface plasmon resonance of gold nanoparticles experiences spectral shifts when they are surrounded by a lower index material—causing a blue-shift and a decrease in intensity of the absorbance peak—which lowers the imaginary part of the RI of the absorbing layer. Both effects weaken the optical Janus effect and cause similar reflection colors to be observed from either side of the sample, as observed in FIG. 14C. In contrast, placing the gold nanoparticle layer in between the substrate and the dielectric film will increase both the real and imaginary part of the effective RI of the absorbing layer, leading to a pronounced structural color asymmetry (FIG. 14B).

Multilayer

Coatings with asymmetric color reflection are not limited to thin films but can also be prepared from multilayer architectures, allowing for an increase in overall reflectivity and more control of the optical spectra. Incorporation of a gold nanoparticle layer into the high RI part of the multilayer structure provides a strong optical Janus effect with a pronounced dissimilarity of observed color depending on the viewing direction (FIGS. 15A-15B). Similar to the thin film architecture, a multilayer without an absorbing layer always shows the same color when observed from both sides (FIG. 15C). When changing the location of the nanoparticles within the multilayer, the effect can be enforced or diminished, depending on the RI of the layer embedding the absorbing nanoparticles (Supplementary Information).

FIGS. 15A-C show the optical Janus effect observed in a multilayer stack. FIG. 15A (left) shows a photographic image of a titania/silica/titania (n=2.45/1.45/2.45) 3-layer multilayer with absorbing gold nanoparticles between the $2^{nd}$ and $3^{rd}$ layers measured from the film surface. Thicknesses of the layers are all 100 nm. FIG. 15A (right) shows simulated (dashed) and measured (solid) spectra of the sample viewed from the coating side. FIG. 15B is similar to FIG. 15A, but viewed from the substrate side. FIG. 15C shows photographic images (top) of a sample containing no gold nanoparticles with the same layers as (a-b) on a glass substrate, with simulated (dashed) and measured (solid) reflectance spectra, measured from both sides of the sample (bottom). The optical properties are identical from both viewing directions. All scale bars are 1 cm.

FIG. 15A shows a photographic image of a titania/silica/titania 3-layer multilayer with absorbing gold nanoparticles between the $2^{nd}$ and $3^{rd}$ layers, as well as a corresponding plot of simulated (dashed) and measured (solid) spectra of the sample viewed from the coating side.

Patterning of Janus Films

In FIGS. 16A-16H, we show micron-scale structures with controllable, viewing direction-dependent optical properties by controlling the spatial patterning of the absorbing elements using photolithographic techniques. We deposit a thin gold film on a photolithographic pattern and apply a lift-off technique to remove the gold film from pre-patterned structures. A dewetting process at 500° C. subsequently transforms the gold film into separated nanoislands at predefined areas (FIGS. 16A-16B). After deposition of a multilayer structure as the photonic element, the nanoparticle-coated areas exhibit the optical Janus effect, while all other areas do not show asymmetric color properties due to the absence of the absorbing element (FIGS. 16C-16D): the color of the predefined pattern in FIGS. 16C-16D changes from orange to green color when viewed from the film side and substrate side, respectively, while the background remains uniformly yellow. A slight modification of the deposition process yields even more complex optical microstructures: when omitting the lift-off step, the photoresist layer is combusted during the dewetting process of the thin gold film. This leaves gold nanoparticles on both areas with and without photoresist. Importantly, a small gap without gold nanoislands remains at the edge between the two areas (FIGS. 16E-16F), providing a clear contrast in the structures shown in FIGS. 16G-16H.

FIGS. 16A-16H illustrate spatially patterned optical Janus properties by local control of absorber deposition. a. SEM image of a single pattern showing the locations of the nanoparticles (bright areas). FIG. 16B shows a higher resolution SEM image of the boxed region in FIG. 16A showing the nanoparticle size distribution. FIG. 16C is an optical micrograph of the coating side of a patterned layer of gold nanoislands created using the method described herein. FIG. 16D is an optical micrograph of the sample of FIG. 16C, viewed from the substrate side. FIGS. 16E-16H are similar to FIGS. 16A-16D, but for a sample made without the lift-off step, such that the gold nanoislands are located everywhere except for the edge of the micropattern. The entire sample shows asymmetric structural color (view from coating side shown in (FIG. 16G); view from substrate side shown in (FIG. 16H)), with the contrast giving by the small regions along the lines of the pattern that do not feature any nanoparticles (see FIG. 16F). Scale bars: a,c-d, 400 µm; b, 1 µm; e,g-h, 10 µm; f, 1 µm.

Figure 17C:
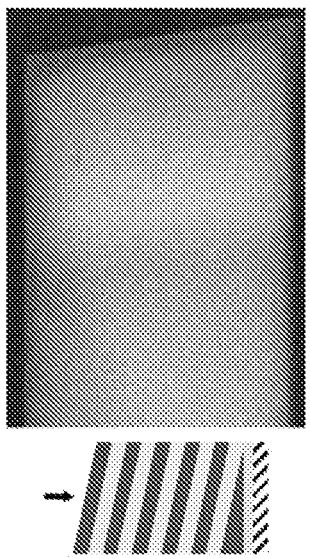
FIG. 17C is a photograph of a structure with 5 bilayers of SiN/SiO$_2$, a gradient-thickness layer of SiN, and a 7 nm thin film of chromium, according to one embodiment.
Figure 17D:
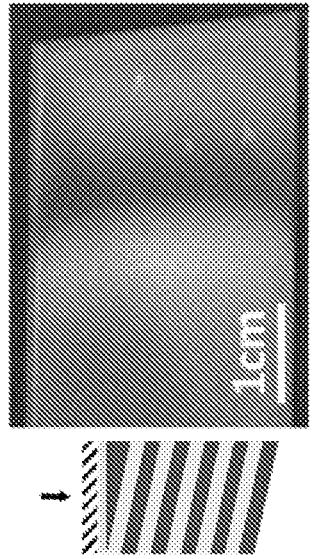
FIG. 17D is a photograph of the structure of FIG. 17C, taken from the substrate side.
Figure 17A:
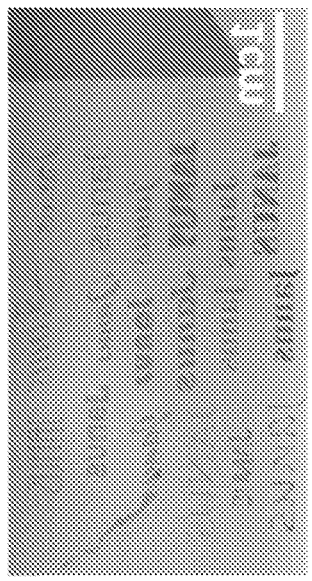
FIG. 17A is a photograph of the coating side surface of a micro-patterned asymmetric structural color stack with 3 bilayers of SiN/SiO2, an additional layer of SiN having a different thickness, and a 7 nm thin film of patterned chromium (Cr), according to one embodiment.
Figure 17B:
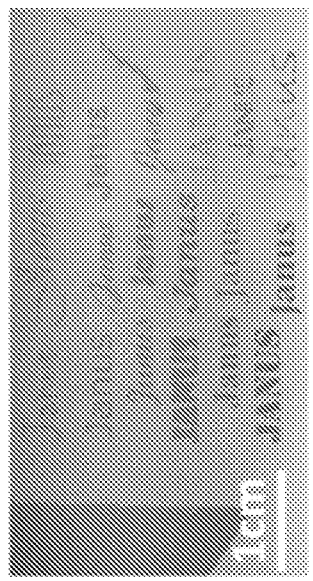
FIG. 17B is a photograph of the substrate side surface of the sample in FIG. 17A, showing a high contrast between the color in the regions containing chromium and the color of the simple Bragg stack.

The optical Janus effect can be created using absorbing elements with a large range of complex RIs, as indicated in FIGS. 14F and 14G. By overlaying the complex refractive index of commonly used metal films into the diagrams, we predict that plain metal films used as absorbing element, e.g., chromium or germanium, can produce strongly asymmetric coloration, enabling simple, scalable and cost efficient fabrication processes. Exemplarily, in FIGS. 17A-17D, we show a patterned optical Janus stack comprising two bilayers of $SiO_2/SiN$ on top of a patterned chromium film on a glass slide. Similar to the gold nanoparticles used above, the large complex refractive index of a chromium thin film induces anomalous phase shifts upon reflection, giving rise to an observed structural color asymmetry. In the example, the structure was designed such that when viewed from the coating side, the pattern would be similar in color to the surrounding Bragg stack color without the absorbing layer, while when viewed from the substrate side, there would be a strong contrast in color between the pattern and background. This creates a viewing-direction selective invisibility of the pattern. An even more complex optical Janus effect is achieved by varying the thickness of the first layer deposited on top of the absorbing layer. Designing the Bragg stack in such a way that its peak wavelength is near the middle of the visible spectrum, we create a sample with nearly uniform coloration when viewed from the front side, while displaying a range of colors when viewed from the substrate side. (see differences in contrast in FIGS. 17C-17D).

Nanoparticles

FIG. 18A is an SEM image of gold nanoparticles. FIG. 18B is an optical image of an approximately 1-inch square glass slide functionalized with plasmonic gold nanoparticles. FIG. 18C is an absorbance spectra of gold nanoparticles in solution and functionalized on glass.

Bragg Stack Formation

Sputter-Coating

Clean glass slides (with or without nanoparticles) were placed in a sputter coater and pumped down to $1 \times 10^{-6}$ atm before sputtering either TiO2 or SiO2. For each layer in the designed Bragg/Janus stack, the process was repeated.

CVD-Coating

An STS-plasma-enhanced chemical vapour deposition (PECVD) from STS was used to create Bragg/Janus stacks more quickly. Silicon dioxide (n=1.45) was deposited by flowing H2O, O2, and SiO3H4 gas; silicon nitride (n=1.9) was deposited by flowing H2O, O2, and N2 gas.

Nanoparticle Functionalization/Patterning

Photolithographic Patterning

Photolithography was performed in an ISO class 5 clean room at CNS, Harvard. Glass slides were cleaned with acid piranha (3:1 30% H2O2:H2SO4 @200° C.) for 30 minutes, and then rinsed with ethanol. Shipley S1805 positive photoresist was spin coated on the sample at 2000 rpm for 45 s and hard baked at 110° C. for 60 s, giving a protective layer thickness of 2 µm. Chrome masks were designed with AutoCAD 2014 and printed using a Heidelberg DWL 66 mask writer. Using a Suss MJB4 mask aligner, softcontact (1.3 bar) was established between the chrome mask and the coated sample. Exposure time was calculated by dividing the exposure dose E0 (180 mJ cm-2 for S1805) by the h-line intensity (405 nm) of the MJB4 mask aligner. Standard exposure time was 1.5 s.

Nanoparticle Creation by Dewetting Gold Thin Films

Figure 19:
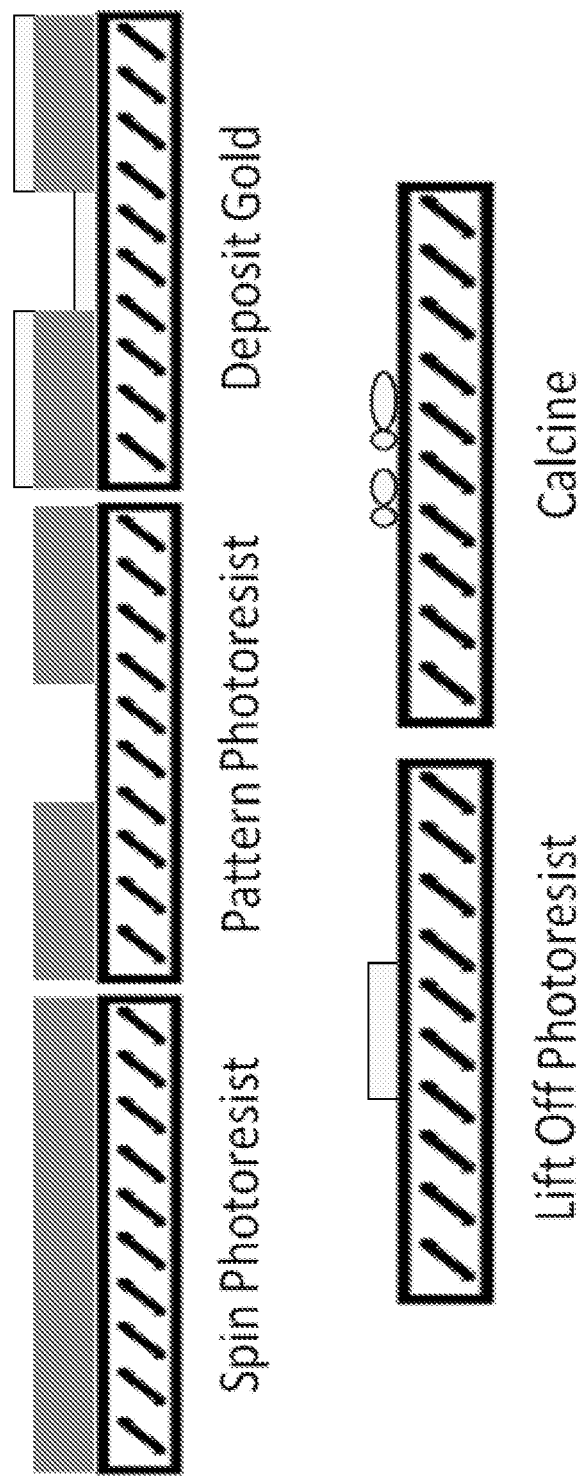
FIG. 19 illustrates a method of creating patterned gold nanoparticles in situ on a sample surface.

For the method of creating nanoparticles from a gold film, a thin film of gold (4-12 nm) was evaporated using a Denton electron beam evaporator. If the photoresist was desired to be removed, RPG solution was used to remove the cross-linked resist and leave behind a patterned gold film. Next, the sample was placed in a calcining furnace which increased the temperature slowly to 500° C. over 5 hours and held it at that temperature for 2 hours in order to dewet the gold film from the substrate and create gold nano-islands with the desired plasmonic properties. Finally, a Bragg stack was deposited on the substrate using the method described above in order to create a Janus stack. FIG. 19 shows a method of creating patterned gold nanoparticles in situ on the sample surface, in accordance with some embodiments.

Figure 20A:
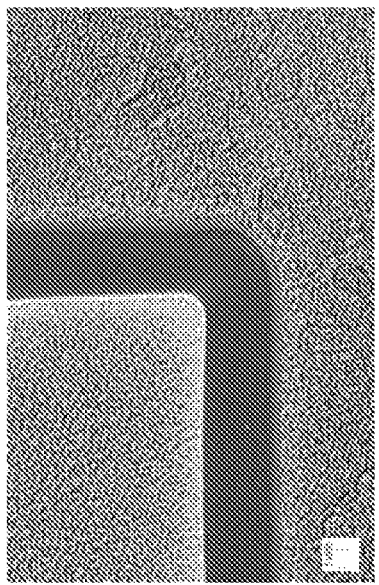
FIG. 20A is an SEM image showing a patterned area of gold nanoparticles (scale bar 10 μm)
Figure 20B:
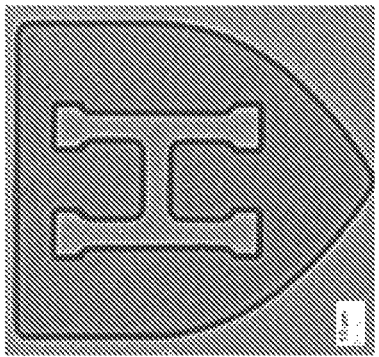
FIG. 20B is a higher-magnification SEM image of one of the corners of the "H" in FIG. 20A (scale bar 1 μm)
Figure 20C:
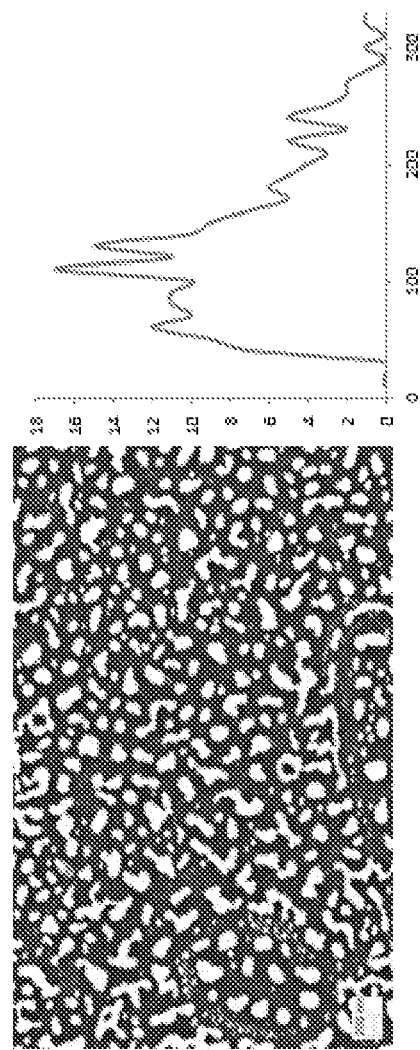
FIG. 20C is a high magnification SEM image (scale bar 200 nm) (left) and nanoparticle size distribution calculated from the image of the sample of FIG. 20A, showing the sizes of the nanoparticles (right) (125+/−63 nm)

FIGS. 20A-20C show a gold nanoparticle size distribution for a 6 nm gold film. FIG. 20A is an SEM image showing a patterned area of gold nanoparticles (scale bar 10 μm). FIG. 20B is a higher-magnification SEM image of one of the corners of the "H" in FIG. 20A (scale bar 1 μm). FIG. 20C shows a higher magnification SEM image (scale bar 200 nm) (left) and nanoparticle size distribution calculated from the image of FIG. 20A, showing the sizes of the nanoparticles (right) (125+/−63 nm).

Nanoparticle Binding

A sample was submersed in 1 ml of aminopropyl trichlorosilane dissolved in 20 ml acetone for 30 min to 1 hr and then rinsed with ethanol. Then, the sample was placed in an aqueous solution of the synthesized nanoparticles for several hours until the gold nanoparticle has bound to the surface.

Optical Characterization

Reflection Spectra Measurement

A Leica microscope with a 50/50 coupler port was used to collect normal incidence reflection spectra for all samples. An optical fiber was coupled into the output port and connected to an Ocean Optics Maya 2000 spectrometer to collect signal from each sample. The raw intensity data was corrected for the dark current of the spectrometer and the intensity distribution of the halogen light source to calculate the reflectance spectra.

In the examples described above in this disclosure, semi-transparent materials, having a different color depending on the viewing direction, have been designed and demonstrated by rationally combining absorbing and structural photonic elements. The physical origin of this optical Janus effect lies in the anomalous phase shift of reflected light caused by the complex RI of the absorbing material. In the stack, the dielectric environment of the absorbing material is anisotropic, leading to a different color from constructive interference on both sides of the sample, which can be predicted by transfer matrix calculations. The optical Janus effect is observed in a wide range of constituent photonic and absorbing elements. These include thin films and multilayer structures as the photonic elements and gold nanoparticles and plain metal films as the absorbing elements. Spatial control of the deposition of the absorbing elements enables the creation of arbitrary asymmetric structural color patterns with controllable, viewing direction dependent coloration as well as more complex anisotropic effects such as viewing direction dependent invisibility of patterns or color travel. This rational design of asymmetric colored materials enables applications in art, architecture and design, and it may also allow for more functional properties, for example in integrated photonic circuits, semitransparent solar cells with independent tunability of absorption profile and transmission color, or security features in anti-counterfeiting materials.

In some embodiments described herein, the formation of multi-layered film on glass substrates was carried out by first rinsing the substrates with ethanol, thereafter, drying it with a stream of air, followed by cleaning with a $CO_2$-snow jet and plasma treatment for 5 minutes. The substrates were then treated with a 4% solution of 3-Aminopropyltriethoxysilane (APTMS) in acetone for 30 minutes, rinsed with acetone and dried with a stream of air. APTMS binds covalently to the surface of glass with the silane function and serves as a binding layer for the attachment of gold nanoparticles through coordination to the amine moiety. Next, the substrates were placed in a solution of 12 nm gold nanoparticles in water for 2 hours, rinsed with water and dried with a stream of air. In order to mask certain areas from the deposition of gold nanoparticles a Scotch tape or a PDMS mask was placed onto the substrates in the desired regions prior to the placement of the substrates into the solution of gold nanoparticles, and was removed at the end of this procedure. Additional layers of $TiO_2$ and $SiO_2$ were deposited using a PVD sputter coating system. The thicknesses of the deposited films were characterized using Woollam Spectroscopic Ellipsometer. The reflectance spectra were obtained using an MET-14 UV-vis spectrophotometer in the reflection mode.

In some embodiments, the multilayered film according to this disclosure could be useful for creation of unique visual effects for decoration of transparent materials, such as, windows, sculptures, etc. Other applications may be, but not limited to, optical materials, transparent display screens, flat glass, window glass, contact lenses, traffic signs, display signs, light fixtures, cosmetic products, protective screens, and anti-counterfeiting materials. In particular, the multi-layer film in accordance with this disclosure may be crushed and/or broken into flakes and particles that can be added as a component in a paint or primer formulation to provide variable appearance dependent on angle of viewing.

As used herein, the term "about" refers to plus or minus 10% of the value referenced. For example "about 100 nm" refers to range of 90 nm to 110 nm.

Upon review of the description and embodiments provided herein, those skilled in the art will understand that modifications and equivalent substitutions may be performed in carrying out the invention without departing from the essence of the invention. Thus, the invention is not meant to be limiting by the embodiments described explicitly above.

What is claimed is:

1. A method of making a multi-layered film comprising:
    providing a transparent substrate having a first side and a second side;
    depositing a plurality of thin film layers on the first side of the substrate;
        wherein the plurality of the thin film layers are transparent and two adjacent layers of said plurality of thin film layers have different refractive indices, and
        wherein each layer of the plurality of thin film layers has a thickness of less than 800 nanometers;
    depositing a plurality of absorbing elements at an interface formed between two adjacent layers of said plurality of thin film layers or formed by the first side of the substrate and a layer of said plurality of thin film layers;

wherein the absorbing elements absorb selected wavelengths of incident light and reflect part of the incident light after inducing a phase shift;

wherein the location of the interface where the plurality of absorbing elements are deposited is selected to provide desired wavelengths of absorbed and reflected light;

wherein the multi-layered film has a first appearance when viewed from the first side of the substrate and a second appearance when viewed from the second side of the substrate;

wherein the first appearance comprises a first reflected color and the second appearance comprises a second reflected color; and wherein the first reflected color is different from the second reflected color.

2. The method of claim 1, wherein the wavelengths of light absorbed and the phase shift are dependent on the number and thickness of layers in the plurality of thin film layers.

3. The method of claim 1, wherein the substrate is made of glass, quartz, metal oxides, mixed transition metal oxides, metal nitrides, or polymers.

4. The method of claim 1, wherein the substrate is made of silicon oxide, antimony tin oxide, zinc oxide, aluminum doped zinc oxide, vanadium oxide, titanium oxide, tin oxide, indium tin oxide, polyethylene, polypropylene, polycarbonate, polymethylmethacrylate, cellulose acetate butyrate, polyethylene terephthalate, polyvinyl chloride, polysulfone, polysaccharides, or proteins.

5. The method of claim 1, wherein the plurality of thin film layers comprises glass, quartz, metal oxides, mixed transition metal oxides, metal nitrides, polymers, dielectric nanoparticles, or composites of polymers with nanoparticles fillers.

6. The method of claim 1, wherein the plurality of thin film layers comprises silicon oxide, antimony tin oxide, zinc oxide, aluminum doped zinc oxide, vanadium oxide titanium oxide, tin oxide, indium tin oxide, polyethylene, polypropylene, polycarbonate, polymethylmethacrylate, cellulose acetate butyrate, polyethylene terephthalate, polyvinyl chloride, polysulfone, polysaccharides, proteins, dielectric nanoparticles, or composites of polymers with nanoparticles fillers.

7. The method of claim 1, wherein the plurality of absorbing elements comprises a transition metal, a transition metal complex, a metal alloy, a metalloid, a metal oxide, a metal nitride, a metal sulfide, or a molecular absorber.

8. The method of claim 7, wherein the plurality of absorbing elements comprises nanoparticles.

9. The method of claim 1, wherein the plurality of absorbing elements are spherical, cylindrical, oblong, prismatic, ellipsoidal, disc, irregular, or acicular in shape.

10. The method of claim 1, wherein each absorbing element of the plurality of absorbing elements comprises an interior core and an exterior shell and the material of the interior core and the exterior shell are different.

11. The method of claim 1, wherein each absorbing element of the plurality of absorbing elements comprises a stack of concentric shells, wherein the stack of concentric shells comprises a plurality of adjacent layers with the adjacent layers made of a first material and a second material, wherein the first material and the second material are different.

12. The method of claim 1, wherein one or more of the plurality of thin film layers have a refractive index of about 1.9.

13. The method of claim 1, wherein the plurality of absorbing elements comprises a thin film.

14. The method of claim 1, wherein the plurality of absorbing elements is deposited first on the transparent substrate followed by the deposition of the plurality of thin film layers above the plurality of absorbing elements.

15. The method of claim 14, wherein the plurality of absorbing elements is treated with a coupling agent to improve adhesion with the transparent substrate or the interface.

16. The method of claim 14, wherein the interface is treated with a coupling agent to improve adhesion with the absorbing elements.

17. A multi-layered film comprising:
a transparent substrate having a first side and a second side;
a plurality of distinct thin film layers on the first side of the substrate;
  wherein the plurality of the thin film layers are transparent and the adjacent distinct thin film layers have different refractive indices, and
  wherein each layer of the plurality of thin film layers has a thickness of less than 800 nanometers;
a plurality of absorbing elements having plasmon resonance at an interface formed between two adjacent layers of said plurality of thin film layers or formed by the first side of the substrate and a layer of said plurality of thin film layers;
  wherein the plurality of absorbing elements forms a patterned film;
  wherein the plurality of absorbing elements absorbs selected wavelengths of incident light and reflect part of the incident light after inducing a phase shift;
  wherein the location of the interface where the plurality of absorbing elements is deposited is selected to provide desired wavelengths of absorbed and reflected light;
  wherein the multi-layered film has a first appearance when viewed from the first side of the substrate and a second appearance when viewed from the second side of the substrate;
  wherein the first appearance comprises a first reflected color and the second appearance comprises a second reflected color; and
  wherein the first reflected color is different from the second reflected color.

18. The multi-layered film of claim 17, wherein the plurality of absorbing elements forms an irregular array.

19. The multi-layered film of claim 17, wherein the plurality of absorbing elements forms a regular array.

20. The method of claim 1, wherein the plurality of absorbing elements have plasmon resonance.

* * * * *